United States Patent [19]

Schuster

[11] 4,346,460

[45] Aug. 24, 1982

[54] METHOD AND APPARATUS FOR DERIVING COMPENSATED MEASUREMENTS IN A BOREHOLE

[75] Inventor: Nick A. Schuster, Darien, Conn.

[73] Assignee: Schlumberger Technology Corporation, New York, N.Y.

[21] Appl. No.: 152,075

[22] Filed: May 21, 1980

Related U.S. Application Data

[63] Continuation of Ser. No. 922,114, Jul. 5, 1978.

[51] Int. Cl.³ .............................................. G01V 1/40
[52] U.S. Cl. ...................................... 367/27; 367/28; 367/911; 181/102
[58] Field of Search .................. 181/102, 104; 367/27, 367/28, 911

[56] References Cited

U.S. PATENT DOCUMENTS

| | | | |
|---|---|---|---|
| 3,900,824 | 8/1975 | Trouiller et al. | 367/28 |
| 3,978,939 | 9/1976 | Trouiller | 181/104 |
| 4,040,001 | 8/1977 | Vivet et al. | 367/27 |
| 4,042,907 | 8/1977 | Trouiller et al. | 367/28 |

FOREIGN PATENT DOCUMENTS

| | | |
|---|---|---|
| 783772 | 4/1968 | Canada . |
| 6809586 | 7/1968 | Netherlands ........................ 367/27 |
| 132814 | 1/1976 | Norway . |
| 140152 | 7/1979 | Norway . |
| 1176350 | 1/1970 | United Kingdom . |

Primary Examiner—Sal Cangialosi
Attorney, Agent, or Firm—Bruce N. Carpenter; Henry N. Garrana; David H. Carroll

[57] ABSTRACT

A technique for producing measurements of physical characteristics of subsurface media near a borehole penetrating the earth is disclosed that uses multiple transducers positioned along a borehole tool. A number of transducers of a first type, such as transmitters, are separated from each other along the tool by a preselected separation, and a number of transducers of a second type, such as receivers, are separated from each other by the same separation and are positioned on the tool at a preselected distance from the transducers of the first type. The technique contemplates the use of appropriate circuitry for producing measurements, using different combinations of transducers, of physical characteristics of the subsurface media at different positions along the borehole.

Furthermore, different combinations of measurements produced at different borehole positions may be compared or combined to produce improved measurements that are compensated for borehole effects and other errors.

37 Claims, 21 Drawing Figures

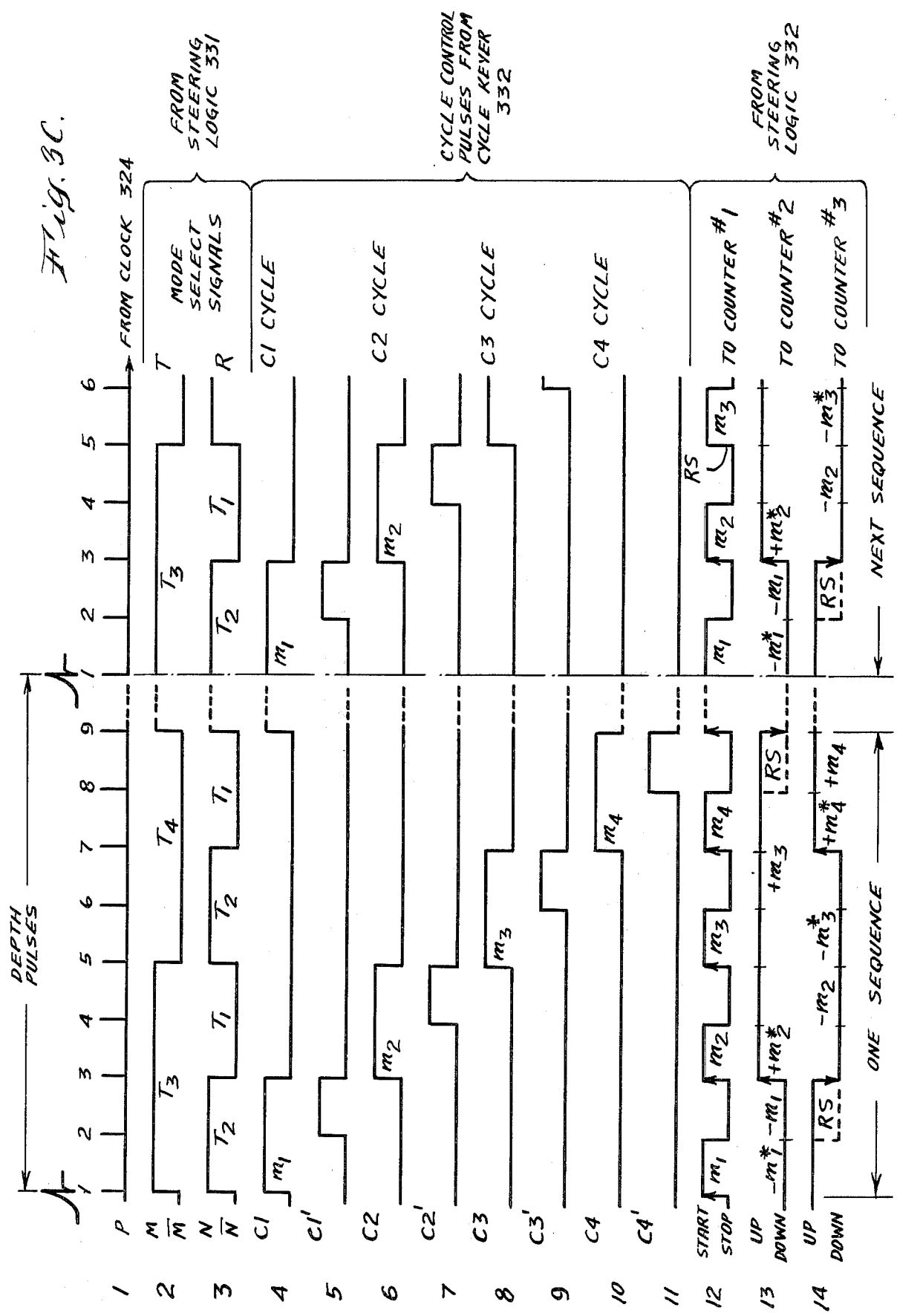

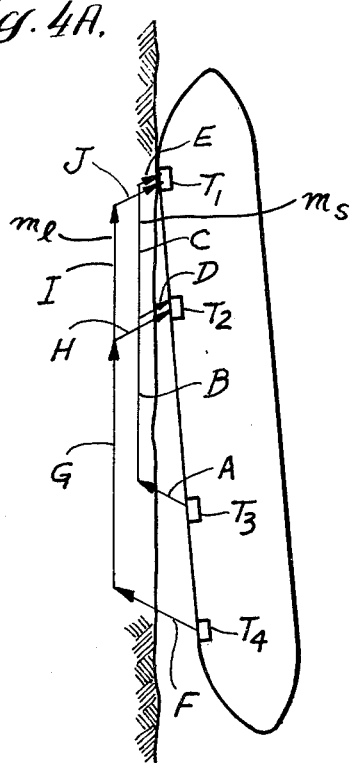
Fig. 4A.
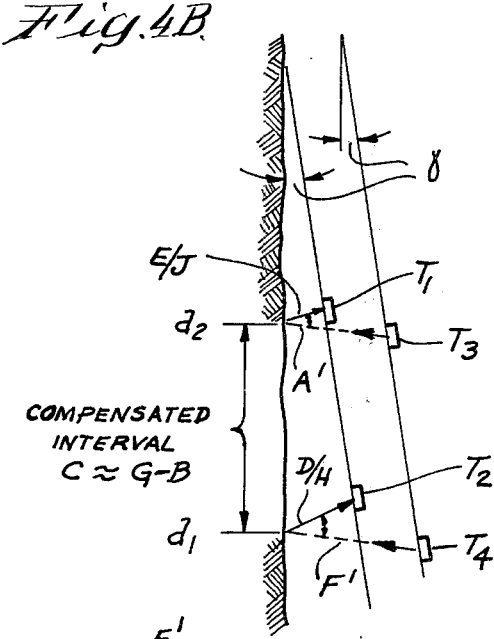
Fig. 4B.
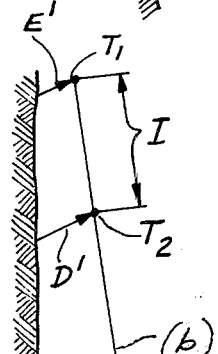
Fig. 4C.
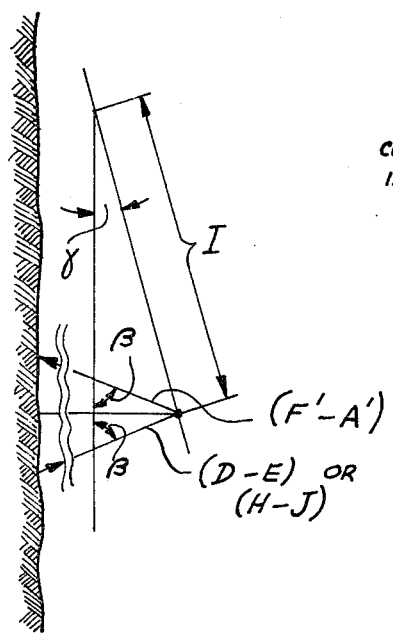
Fig. 4D.
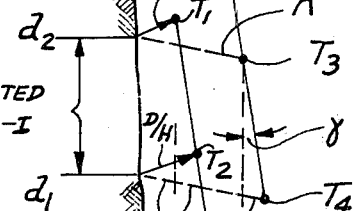
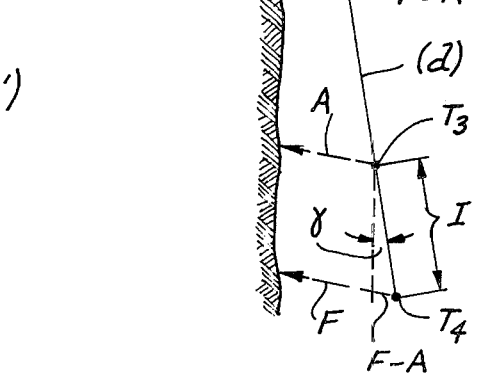

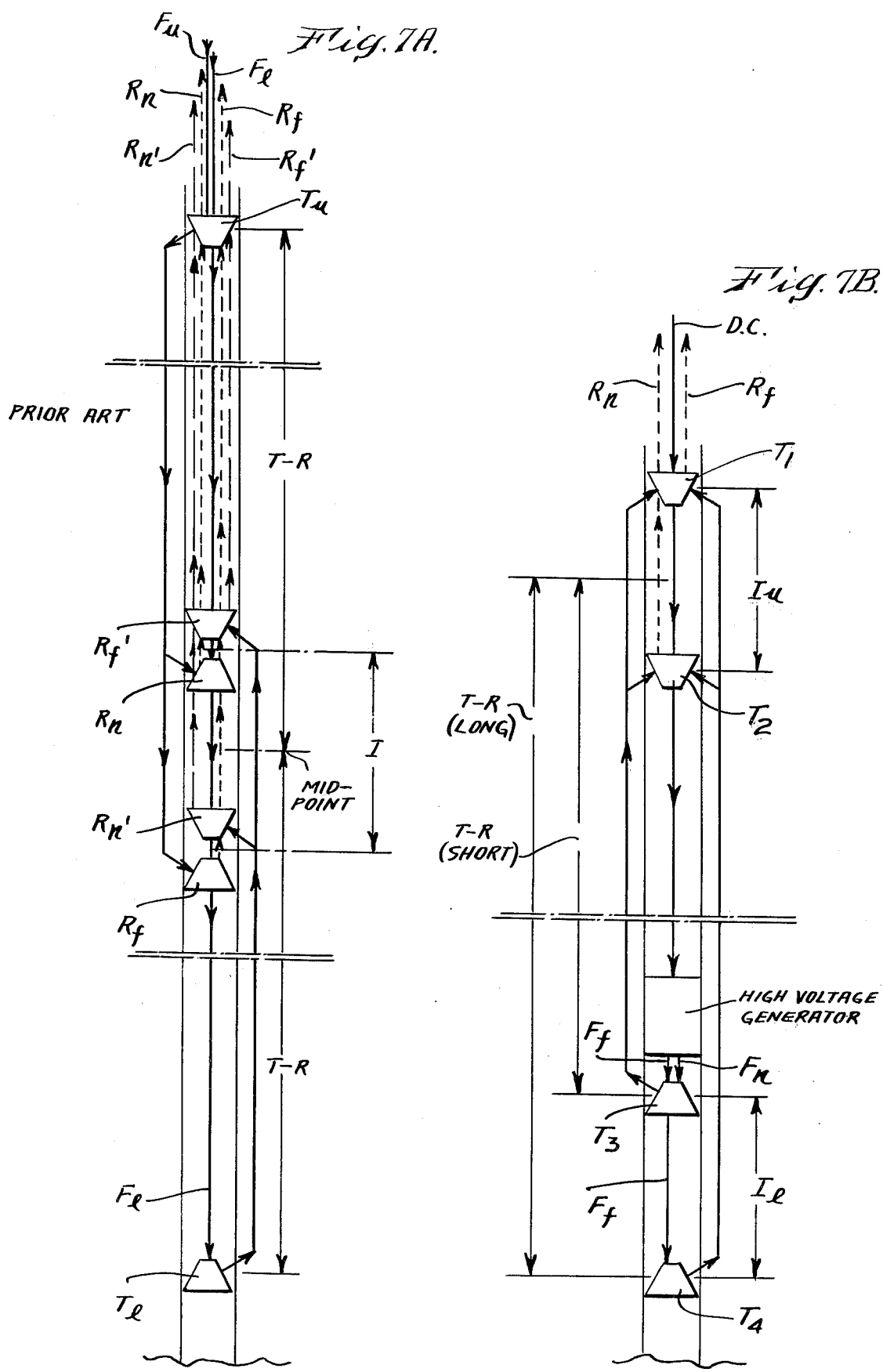

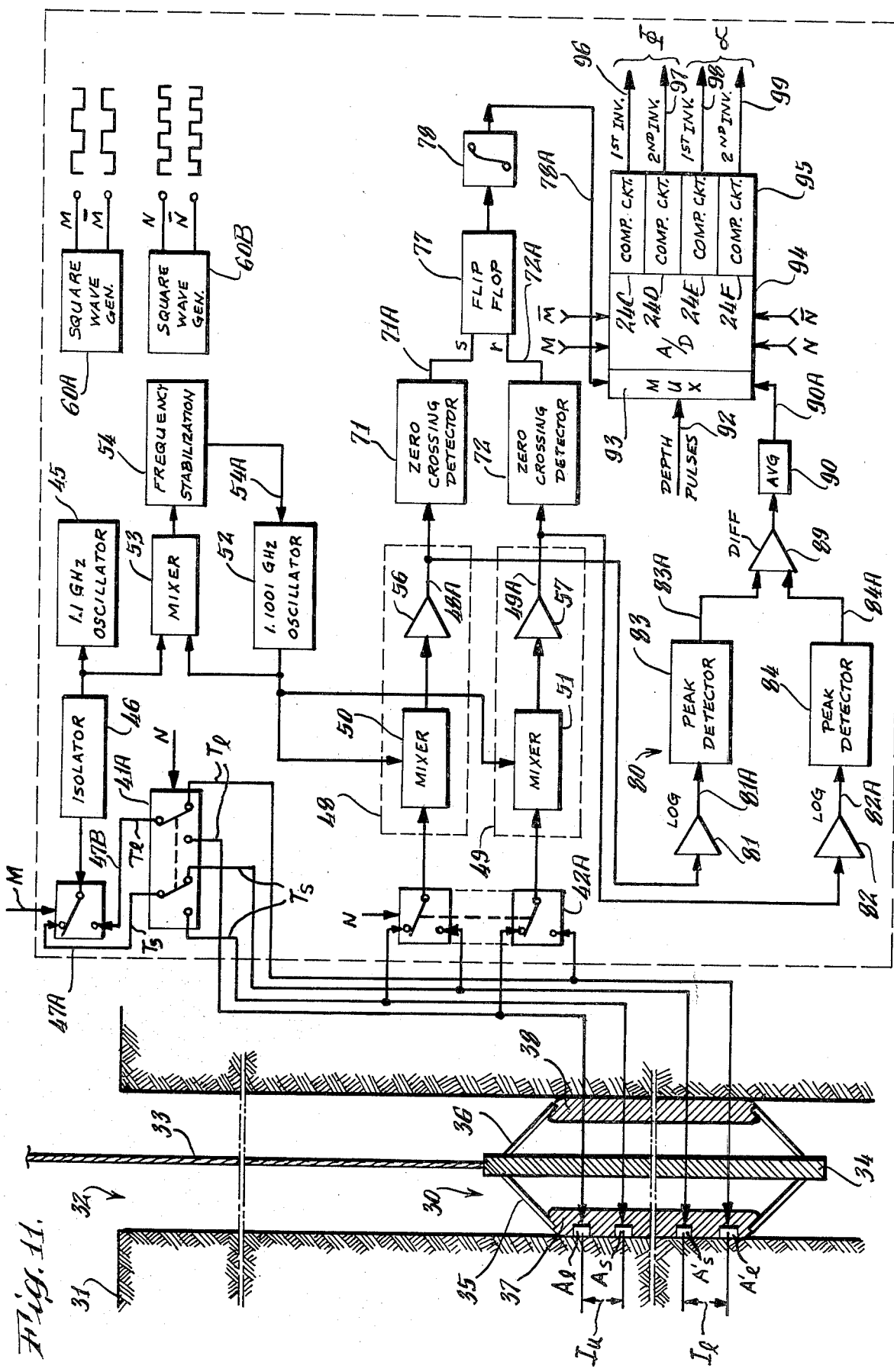

METHOD AND APPARATUS FOR DERIVING COMPENSATED MEASUREMENTS IN A BOREHOLE

This is a continuation of U.S. patent application Ser. No. 922,114; filed July 5, 1978 which was a continuation of U.S. Pat. application Ser. No. 687,478 filed May 17, 1976, both parent applications now abandoned.

BACKGROUND OF THE INVENTION

This invention relates to well logging methods and apparatus, and more particularly, to methods and apparatus for producing measurements from multiple transducer arrays and combining them to provide compensation for variations in instrumentation and borehole conditions.

It is well known in the art of acoustic logging that some degree of compensation for variations in travel time introduced by changes in borehole diameter may be provided by a borehole tool that includes two receivers and one transmitter. (Such arrays will be abbreviated hereinafter by using a "T" to represent a transmitter and an "R" to represent a receiver with the relative positions at the T's and R's indicated by the sequence, the hyphen "-" separating the transducers indicating a common signal path. Thus a T-RR array specifies a transmitter on one side of two receivers, with the receivers having in common the signal path between the transmitter and its nearest receiver.) Unfortunately, such a T-RR arrangement does not compensate for the tilt of the tool with respect to the axis of the borehole. To overcome the tilt problem an additional transmitter may be provided to form a tool that has a T-RR-T array. As described in U.S. Pat. No. 3,257,639 issued to F. P. Kokesh on June 21, 1966, each of the two transmitters may be selectively operated and the travel time to each of the two receivers measured. The individual travel time measurements may then be combined to produce an average travel time for the interval between the two receivers. That average time has the advantage of being compensated for both changes in borehole diameter and tilt of the tool.

As with many different types of measurements under conditions varying non-homogeneously in a direction radial to the borehole, acoustic measurements appear to vary with distance between transmitter and receiver or, more appropriately for two-receiver arrays, with the distance between the transmitter and a point midway between the receivers. It is for this reason that the borehole-compensating type tools have two transmitters located equidistant from that mid-point.

As recognized in U.S. Pat. No. 3,312,934 issued Apr. 4, 1967 to A. A. Stripling, one reason why the acoustic velocity may vary with different T-R distances is that different signal paths may result with the longer distance having a path somewhat farther from the borehole and deeper into the formation. This deeper path may be less affected by factors which radially alter acoustic properties when drilled or exposed to the borehole fluid, such as hydrophilic shales which tend to swell. This altered zone may exist deep enough into the formation to cause a short T-R distance to measure, at least in part, properties representative of this altered zone, rather than the desired unaltered formation. Longer T-R distances, such as 8 or 10 feet, are preferred to overcome this particular formation alteration problem.

Longer T-R distances require longer tools, and in the older two-receiver type arrays, i.e., those of the T-RR type, an increase from 3 to 8 feet in T-R distance requires a 5 foot longer tool. However, in the T-RR-T borehole compensating tools, such a substantial increase in T-R distance results in undesirably long tools since the T-R distance occurs twice. Longer tools are undesirable since their length makes them more expensive and difficult to transport and increases the problem associated with getting them down crooked or inclined boreholes.

It is therefore an object of this invention to provide method and apparatus which retain both the advantages of long T-R distances and borehole compensation without requiring unduly long borehole tools.

Borehole compensating type arrays are also employed in sidewall devices such as disclosed in U.S. Pat. No. 3,849,721, issued to T. J. Calvert on Nov. 19, 1974. Here longer T-R distances in the prior art T-RR-T array increase skid length, which unfortunately decreases the chances of keeping the skid in continuous contact with the borehole wall.

It is an additional object of the present invention to provide methods and apparatus which retain the borehole compensation features provided by a T-RR-T array in a sidewall skid, yet allow for increasing the T-R distance without increasing the skid length.

Previous approaches to providing at least a partial compensating system without unduly long tool lengths, such as described in U.S. Pat. No. 3,207,256 issued to R. B. Blizard on Sept. 2, 1965 or U.S. Pat. No. 3,330,374 issued to D. E. Broussard et al. on July 11, 1967, require memorization of at least two different measurements for at least two different distances. This requirement leads to additional memory costs and more vulnerability to depth positioning problems such as introduced by a yo-yo motion of the tool. Further, the compensation for tool tilt is not always complete.

Therefore, it is a further object of this invention to provide methods and apparatus which provide a more complete borehole compensation including tool tilt yet require a minimum of different depth positions and memorization distances.

A further problem with either the T-RR-T or its reciprocal, The R-TT-R array, is that because of the large distances between the T's in the T-RR-T array or the R's in the R-TT-R array, the operating conditions for transducers located at the ends of the array may be quite different, resulting in significant differences in the received signals which are presumed to be equal. For example, if severe tool tilt places one of the outer transducers in a substantially eccentered position while the like corresponding transducer at the other end of the tool remains more centered, signals associated with these outer transducers could vary considerably and, in turn, could affect both the travel time and the amplitude measurements.

It is therefore an object of the present invention to provide methods and apparatus having all like transducers grouped together while still providing borehole compensated measurements.

When a T is between a pair of R's or an R between a pair of T's, there is often a problem with electrical noise, as for example with electrical cross-talk from an electrically noisy transmitter circuit into receiver leads which must pass close to the transmitter or still worse, from a transmitter firing lead having high voltage and current transients, as in the case of acoustic tools, which pass by one of the receivers or received signal amplifiers. For example, the firing pulse leads going to the bottom transmitter in the T-RR-T array must pass by both receivers. A further appreciation of the electrical and mechanical problems introduced by transmitter leads passing receivers may be found in U.S. Pat. Nos. 3,734,233 and 3,712,410. It would be highly desirable to have a compensating array where all receivers could be isolated from all transmitters and further, where no high voltage pulse leads pass anywhere near a receiver, its associated amplifier or receiver signal lines.

Therefore, it is a further object of the present invention to provide a borehole compensating type array where all receivers and associated receiver signal circuitry may be readily isolated from the transmitters and their associated firing circuitry.

In prior art compensation type arrays and in some two receiver arrays, it was not possible to obtain measurements over some parts of the borehole. For example, in the T-RR-T array, the tool might not operate properly with the upper transmitter inside the casing and the remaining transmitter and both receivers still out in the open hole. Similarly, measurements of the formation could not be made in the critical bottom part of the hole for a distance corresponding to at least one transmitter-receiver distance. It would be desirable to be able to log as close to the bottom as possible, even if it were necessary to temporarily forego the compensation feature for this interval.

It is therefore an additional object of the present invention to provide methods and apparatus which are capable of making measurements over its entire array length.

In acoustic tools which may be required to operate at some distance from the borehole wall, the acoustic signals arriving at a given receiver effectively leave the borehole wall at a point ahead of the receiver, the displacement of the point varying with the approach direction. This gives rise to what is known as a refraction error. This error and one correction technique for compensating type arrays, as described in U.S. Pat. No. 3,304,536, issued Feb. 14, 1967 to F. P. Kokesh, and U.S. Pat. No. 3,524,162, issued Aug. 11, 1970 to F. W. Zill, involves the use of an additional receiver with each of the two existing receivers. Each additional receiver is spaced from each existing receiver by a small distance corresponding approximately to twice the displacement introduced by the refraction error—one displacement for each of the two different reception directions. Thus, four receivers are used, two for each reception direction.

Further, in the T-RR-T type array, omnidirectional receivers are required since each receiver must anticipate signals arriving from either the upper or lower transmitter. Highly desirable directional receivers cannot be used unless four receivers are employed, as in the above refraction correction approach; i.e., two receivers directed towards each of the transmitters. Another approach would be to use the R-TT-R type array, but now desirable directional transmitters cannot be used unless, as with the four-receiver approach, four transmitters are employed. Needless to say, these extra transmitters add considerable control complexity and expense.

Consequently, it is an object of this invention to provide a compensation type array which permits all receivers and transmitters to be directional, yet still requires only four transducers to produce the measurements needed to provide compensation.

Two different T-R distance investigations are desirable and, as described in the above discussed U.S. Pat. No. 3,312,934 patent, it is possible the close comparison of the different investigations may even lead to a direct indication of the presence of hydrocarbons when it occurs in the form of gas, or in some cases, to estimate the degree of shaliness as suggested in U.S. Pat. No. 3,096,502, issued to C. B. Vogel on July 2, 1963. It should be apparent that in order for measurements having different T-R distances to be useful in these applications, the measurements must be as accurate as possible. The accuracy of the T-RR type of measurements illustrated in the above patents is often such that the observed differences in these different investigations may actually be due to uncompensated tilt or system measurement errors, rather than radial differences in the acoustic properties of the formations. At least two measurements are required for this application, and it is important that both of these measurements be borehole compensated.

It is therefore an additional object of the present invention to provide methods and apparatus to obtain two differently spaced, that is, long and short T-R, investigations that are both compensated for borehole and system measurement errors.

When using prior art compensation type arrays to obtain the different T-R distance investigations, two additional outside transducers at an additional distance beyond those usually provided and a large number of additional measurement subcycles beyond the four normally employed would be necessary. Furthermore, the tool length would be increased by twice the desired difference in distance. Such requirements for additional transducers and tool length render the second measurement impractical under many circumstances, since the second measurement is usually redundant to the first measurement. However, if it could be provided without such costly complications, this second measurement would increase the value of the primary measurement by providing substantial assurance that at least the longer T-R distance was adequate for altered formations and when favorable conditions did occur, would provide a direct indication of the presence of gas.

It is therefore a still further object of the present invention to provide methods and apparatus to obtain simultaneously two different borehole compensated measurements with different T-R investigation distances and without requiring additional transducers, substantial increases in tool length or a significant number of additional measurement subcycles.

SUMMARY OF THE INVENTION

Accordingly, methods and apparatus are provided for using a borehole tool to produce measurements of physical characteristics of subsurface media near a borehole penetrating the earth and to obtain improved measurements that are compensated both for changes in the borehole diameter and for misalignment of the borehole tool with the borehole. A number of transducers are positioned along either the tool or a support member included within the tool and are supported in a line generally parallel to the movement of the tool when in the borehole.

As used herein, the term "transducer" means a device that is capable of either transmitting or receiving a particular type of signal. For example, in acoustic measurements the transducer may be either an acoustic transmitter or an acoustic receiver, the transmitter serving to convert electrical energy into mechanical or acoustic energy and the receiver to convert acoustic energy into electrical energy. Similarly, in electromagnetic wave measurements, the transducer may be an antenna or radiator of electromagnetic waves while the receiver may be an antenna for detecting transmitted electromagnetic waves.

A number of transducers of a first type, such as transmitters, are separated from each other along the tool by a preselected separation, and a number of transducers of a second type, such as receivers, are separated from each other by the same separation and positioned a preselected distance on the tool from the transducers of the first type.

The distance between the two same-type transducer groups may be as long as desired. An array constructed as above using transducers of the first type capable of operating as T's and of the second type as R's may be described as a TT-RR array. Measurements produced at selected borehole depths between different transmitter-receiver combinations as the transducer array is moved through the borehole may be combined to produce compensated measurements.

For example, with the above novel TT-RR array, two measurements with the same T-R spacing that use different T-R combinations are possible, since the separation between each receiver pair equals the separation between each transmitter pair. If one measurement is made with a first T-R pair at a selected borehole depth and a second measurement is made when a second T-R pair has moved to the same depth, the two measurements may be combined to provide a measurement that is compensated for variations between the characteristics of the transducers and other systematic errors.

Furthermore, differential measurements between one transmitter and two receivers when the two receivers are adjacent a selected interval in the borehole at a selected depth can be repeated when the two transmitters are adjacent the interval and all of the measurements combined to produce a borehole compensated measurement for the interval; i.e., a measurement that is compensated for tool tilt, borehole eccentricity, etc.

Moreover, due to the arrangement of transducers in the array, different measurements that are compensated for borehole errors can be obtained for two different T-R investigation distances; i.e., a long T-R measurement and a short T-R measurement. In each of the long- and short-T-R measurements, each transducer in one group respectively spaced the longest and shortest distance from the other group is used, and in such use, may be regarded separately as the long and short spacing transducer in each group, that is, the transducers in each group that are, respectively, the longest and the shortest distance from the other group.

Since the groups of same-type transducers are closely positioned on the tool, the operating environment, direction of signal propagation and the refraction error are essentially the same for either of the transducers in a given group during a given measurement. As a result, directional receivers and transmitters may be used, thereby improving the quality of the measurements obtained.

While acoustic and electromagnetic transducers are illustrated in centralized and sidewall skid configurations, this invention applies as well to other types of measurements using at least four transducers, operated either in a pulsed or continuous mode while making one or more measurements such as travel time, phase angle, amplitude ratio or attenuation-like measurements.

BRIEF DESCRIPTION OF THE DRAWINGS

Further features and advantages of the invention will become more readily apparent from the following detailed description when taken in conjunction with the accompanying drawings.

FIGS. 2A through 2C show the measurement acquisition sequence using the transducers included in the apparatus of FIG. 1;

FIG. 3C shows the corresponding timing diagram.

FIGS. 4A through 4D show the effect of borehole conditions such as misalignment and tilt of a transducer support on the techniques of the present invention;

FIGS. 7A and 7B show further advantages of a transducer array modified in accordance with the present invention;

FIGS. 10 and 11 show further embodiments of apparatus in accordance with the present invention.

DESCRIPTION OF THE PREFERRED EMBODIMENT

Figures 1, 2:
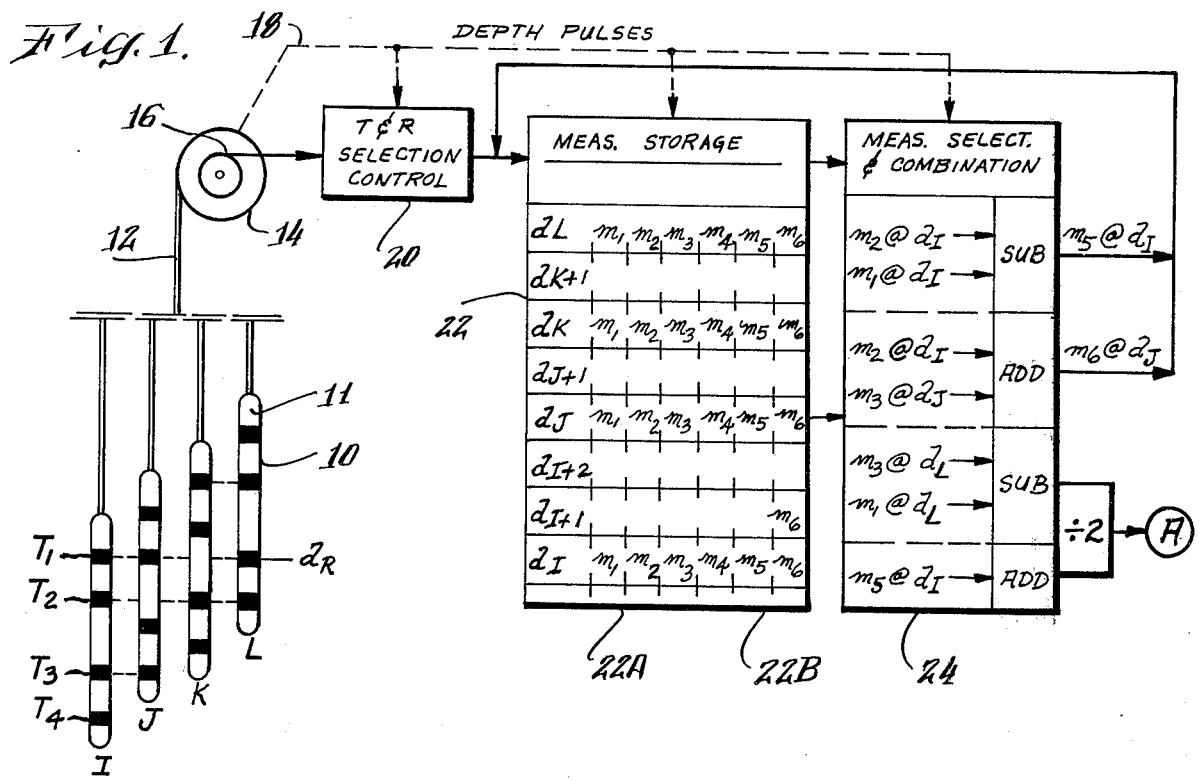
FIG. 1 shows, in representative block form, apparatus in accordance with the present invention for acquiring, storing and combining measurements of physical characteristics of subsurface media near a borehole.

Referring to FIG. 1, there is shown in representative block form suitable apparatus in accordance with the present invention for acquiring, storing, recording and combining measurements of physical characteristics of subsurface media near a borehole that penetrates an earth formation. The apparatus includes a borehole tool 10 with a transducer array having four transducers numbered 1 through 4. The array may be included in a tool that is either a mandrel type adapted for centralized or eccentered operation or in a skid member, with the transducers located on the skid for operation in close contact with the borehole wall.

The explanation which follows assumes that the tool has been run to the bottom of the borehole so that it can then be retrieved slowly towards the surface under mechanical control of a logging wireline 12 wound on a winch 14 at the surface, which also provides signal and control communication between the tool and surface control 20. In this manner, movement of the tool may be directly related to the movement of the wireline at the surface.

The surface controller 20 acts as a programmed transmitter and receiver selector, which communicates through a slipring collector 16 on the winch 14 to the logging wireline 12 and downhole to subsurface control 11 in the tool 10. Synchronously with the wireline movement, incremental depth pulses are provided to both the controller 20 and to the measurement storage apparatus 22 through any appropriate mechanical or electrical connection 18 and, if present at the well site so that the measurement processing may be done at the same time, to the measurement selection and combination apparatus 24. In this manner, the transducer selection and corresponding measurements are synchronized as described hereinafter.

It is understood that the actual measurement selection and combination need not be done in conjunction with the acquisition of the individual measurements since these measurements may be provided at any later time from conventional analog or digital storage facilities for processing at a site remote from the borehole. It is important, however, that incremental depths corresponding to the movement of the tool in the borehole be recorded in conjunction with the measurements, since it is necessary, as described hereinafter, to accurately relate the measurements to one another on a depth basis.

As the tool 10 containing the four transducer array is moved upward through depth positions I, J, K and L, various transducers are selected in a systematic manner such that a sequence of measurements is made at regular depth increments. It is customary that a particular point on the tool be selected as a reference point so that measurements taken with various transducers can be related to one another and to the depth of the tool in the borehole as recorded at the surface. Although any point may be selected, FIG. 1 shows and the description hereinafter is based on the selection of the depth reference point as being the location on the tool 10 at the upper-most transducer; i.e., the transducer that is closest to the surface of the earth as the tool advances through the borehole.

In order to describe the sequence of measurements, reference is made to FIGS. 2A through 2C, which show the four transducer array of the tool 10 as $T_1$ through $T_4$. For descriptive purposes, the letter T with a subscript will be used to indicate transducers, either receivers or transmitters. Further, it will be assumed that the two upper-most transducers, $T_1$ and $T_2$, operate as receivers and that the two lower-most transducers, $T_3$ and $T_4$, operate as transmitters.

It is desirable that transducers of a particular type, such as those operating as receivers, be grouped or paired together in the tool and that groups of transducers move laterally and vertically in the borehole in a coordinated fashion. Furthermore, for reasons which will be apparent hereinafter, the preselected separation between transducers in each group should be the same; i.e., the separation between $T_1$ and $T_2$ along the length of the transducer support member of the tool should be the same as the separation between the transmitters $T_3$ and $T_4$. The distances between the groups of different types of transducers, for example, the distance between receiver $T_2$ and transmitter $T_3$, may or may not be the same as the separation between same-type transducers depending on the physical characteristics of the earth formation being measured, the depth of investigation into the earth formation desired, and other factors.

FIGS. 2A, 2B and 2C each show the transducer array $T_1$, $T_2$, $T_3$ & $T_4$ in two separate positions indicated by the depth level indexes at the top of each transducer array. These indexes, I through L, are referenced to the top transducer $T_1$. In FIGS. 2A and 2B, these positions are I and L; i.e., the top transducer $T_1$ at depth levels $d_I$ and $d_L$, respectively. In FIG. 2C, the two positions are labeled I and J because the top transducer $T_1$ is at depth levels $d_I$ and $d_J$, respectively.

As the array is advanced from position I to L in FIGS. 2A and 2B and I to J in FIG. 2C, the array moves up the borehole from depth $d_I$ through $d_L$, using the $T_1$ as the depth reference point. A signal is generated by transmitter $T_3$, which will propagate uphole towards receivers $T_2$ and $T_1$. Each of these receivers will convert the received signal into a corresponding electrical signal which may be processed into a measurement m. Since it is normally expected that a signal traveling from $T_3$ toward $T_2$ and $T_1$ will arrive first at $T_2$ and then $T_1$, the $T_3-T_2$ measurement will be designated as $m_1$ and $T_3-T_1$ as $m_2$. Measurements $m_1$ and $m_2$ may then be combined to obtain a measurement of a subsurface physical characteristic in a manner that will depend on the characteristic being measured.

For example, if $T_3$ is transmitting an acoustic pulse, measurements $m_1$ and $m_2$ will represent travel time through the formation and media surrounding the borehole from $T_3$ to $T_2$ and $T_1$, respectively, and then may be combined to determine the interval travel time between $T_2$ and $T_1$, called $\Delta t$.

At some short time separation from the generating of a signal by transmitter $T_3$, a signal is generated by transmitter $T_4$, as shown in FIG. 2B, which is received by receivers $T_2$ and $T_1$ and there converted into measurements $m_3$ and $m_4$, respectively.

A complete sequence of measurements at depth $d_I$ would include, therefore, all of measurements $m_1$, $m_2$, $m_3$ and $m_4$. Hereinafter, m will designate individual measurements in general, irrespective of type; $m_1$ being made while operating $T_3$ with $T_2$ and $m_2$ with $T_1$; and $m_3$ operating $T_4$ with $T_2$ and $m_4$ with $T_1$.

Since the four measurements may be acquired in a very short period of time relative to the tool movement, they may be considered as essentially acquired at the same depth. For example, acoustical transmitters may be pulsed on the order of 20 times per second. This rate provides at least five complete sequences per second during which a very small tool displacement would take place at normal logging speeds. The four measurements are transmitted uphole and stored for later use as shown at 22A in FIG. 1 and as will be described in greater detail hereinafter.

At some later time, when the tool has advanced through the borehole to depth $d_L$, as shown in FIGS. 2A and 2B, a second sequence of measurements $m_1$, $m_2$, $m_3$ and $m_4$ may be taken and may be used in accordance with the present invention for compensating for borehole effects on the individual measurements.

For example, when $T_3$ is an acoustic pulse transmitter, the interval travel time, $\Delta t$, between $T_2$ and $T_1$ will be in error if the portions of the signal propagation paths that are located in the borehole are of different lengths at the two receivers. Such a difference would occur in the case of tool tilt.

Prior art borehole compensation techniques in acoustic logging tools use separate transmitters located on opposite sides of the receivers in a T-RR-T array to obtain two $\Delta t$'s having reversed near and far receiver relationships.

In accordance with the present invention, that type of borehole compensation is possible with an array having a significantly shorter overall length. By combining a first set of measurements, $m_1$ and $m_2$, taken at depth $d_I$ (see FIG. 2A at I) with measurements $m_1$ and $m_3$ taken at depth $d_L$ (see FIG. 2A at L) a novel combination of measurements from transducers having a reversed near and far relationship is obtained that provides the desired borehole compensation.

Furthermore, a second borehole compensated measurement can be made simultaneously with and over the same interval in the borehole as the borehole compensated measurement described above. Such a second measurement cannot be obtained with the prior art T-RR-T array. Referring to FIG. 2B, by combining a second set of measurements, $m_3$ and $m_4$ taken at depth $d_I$ (see FIG. 2B at I) with measurements $m_2$ and $m_4$ taken at depth $d_L$ (see FIG. 2B at L), a second borehole compensated measurement is obtained, but here having a longer T-R distance than the first measurement. This is because this second set of measurements is referenced to transducers more distant than in the first set.

A further advantage of the transducer array of the present invention relates to the use of the array to compensate for statistical or systematic errors in the measurements taken and may be described in connection with FIG. 2C.

Note that measurement $m_2$ at depth $d_I$ is essentially repeated by $m_3$ at $d_J$, when $T_2$ replaces $T_1$ and $T_4$ replaces $T_3$ as the tool advances through the borehole. Under perfect measurement conditions, therefore, $m_2$ should equal $m_3$. However, under typical borehole measurement conditions there are several known reasons why this may not occur. Even if small statistical variations may be expected, for example when acoustic interval transit time measurements are being made, an improved measurement is obtained by averaging $m_2$ at $d_I$ and $m_3$ at $d_J$ to provide a measurement that is compensated for such statistical variations. While comparable statistical compensation might be accomplished by repeating the measurement at $d_I$, such repeat measurements cut the duty cycle of the tool by half. In contrast, no increase in duty cycle is required to obtain this result by combining the already available $m_2$ and $m_3$. Further, as will be explained hereinafter, there are other reasons why it is preferred to use different transducers and even different tool positions to obtain measurements for such combinations.

While not shown in FIG. 2C, it will be appreciated that other measurements may also be combined advantageously to compensate for random noise or different transducer effects and their relative positions in the borehole. For example, $m_2$ at depth $d_K$ may be used with $m_3$ at $d_L$.

In some cases measurements such as $m_2$ and $m_3$ may also be compared to detect borehole distortions, such as tool tilt. A comparison of such measurements can give an indication of the borehole compensation being applied to the basic measurements and, thereby, an indication of the reliability of the borehole compensated measurements.

As described above, all four measurements in each sequence are not essential to provide one compensated measurement, nor is it necessary to make each measurement after individual transmitter firings as described. However, as shown in FIGS. 2A–2C and summarized below, each individual measurement will be used at least twice in different combinations to provide two different borehole compensated measurements of a selected borehole interval, corresponding to two different transmitter-receiver investigation distances:

TABLE I (1) $m_2$ and $m_1$ at $d_I$ (interval $T_2$ to $T_1$ operating $T_3$)
(2) $m_3$ and $m_1$ at $d_L$ (interval $T_3$ to $T_4$ operating $T_2$)
(3) $m_4$ and $m_3$ at $d_I$ (interval $T_2$ to $T_1$ operating $T_4$)
(4) $m_4$ and $m_2$ at $d_L$ (interval $T_3$ to $T_4$ operating $T_1$)
(5) $m_2$ at $d_I$ ($T_3$ to $T_1$) and $m_3$ at $d_J$ ($T_4$ to $T_2$)
(6) $m_2$ at $d_K$ ($T_3$ to $T_1$) and $m_3$ at $d_L$ ($T_4$ to $T_2$)

As shown in FIG. 1, each measurement $m_1$, $m_2$, $m_3$ and $m_4$, is stored in measurement storage apparatus 22 for each increment of depth $d_I$, $d_{I+1}$, . . . etc.; each increment being on the order of six inches or less.

If measurement storage capacity is limited, it is advantageous to combine some of the measurements to minimize the needed capacity. For example, measurements $m_1$ and $m_2$ for the same depth increment (see FIG. 2A at Position I and depth increment $d_I$) may be subtracted in measurement selection and combination apparatus 24 to form a new measurement $m_5 = m_2 - m_1$, which in turn may be stored, replacing both $m_1$ and $m_2$ or, if sufficient storage capacity exists, as an additional measurement.

As the array is advanced through the borehole from $d_I$ to $d_J$, other measurements may be combined to form replacement or additional measurements. As the array is advanced to depth $d_L$ (see Position L in FIG. 2), a complete set of measurements will be produced. Those previously acquired are now available from storage 22A and those acquired at depth $d_L$ now available as current measurements. Thus, it is then possible to combine these produced measurements to provide compensated measurements for the borehole interval shown in FIG. 2 below $d_I$.

For example, by subtracting $m_1$ from $m_3$ produced at $d_L$, the current depth at position L shown in FIG. 2A and combining this result with measurements $m_2$ and $m_1$ at $d_I$ previously produced at position I, or its previous combination $m_5$ at $d_I$, the borehole compensated measurement for the borehole interval illustrated in FIG. 2 corresponding to the short T-R distance investigation is provided.

The above combinations result, for an acoustic logging embodiment, in adding two $\Delta t$ measurements for the same borehole interval, one corresponding to a two-receiver measurement and the other to a two-transmitter measurement, to provide the desired borehole compensation. Depending upon the separation between the like-transducer pairs, the result may need rescaling. If, for example, the separation is one-foot, the correct $\Delta t$, as indicated by output A, will be obtained by dividing the final combination by two.

In addition to combining these two $\Delta t$ measurements as described above, various measurements at various depth levels could be compared to indicate borehole conditions requiring compensation or combined in a manner to provide the average measurements. For example, $m_2$ at $d_I$ (see FIG. 2C at I) and $m_3$ at $d_J$ (see FIG. 2C at J) may be added or averaged to form $m_6$. These average measurements could then be combined to provide $\Delta t$ measurements or for other purposes.

Figure 3A:
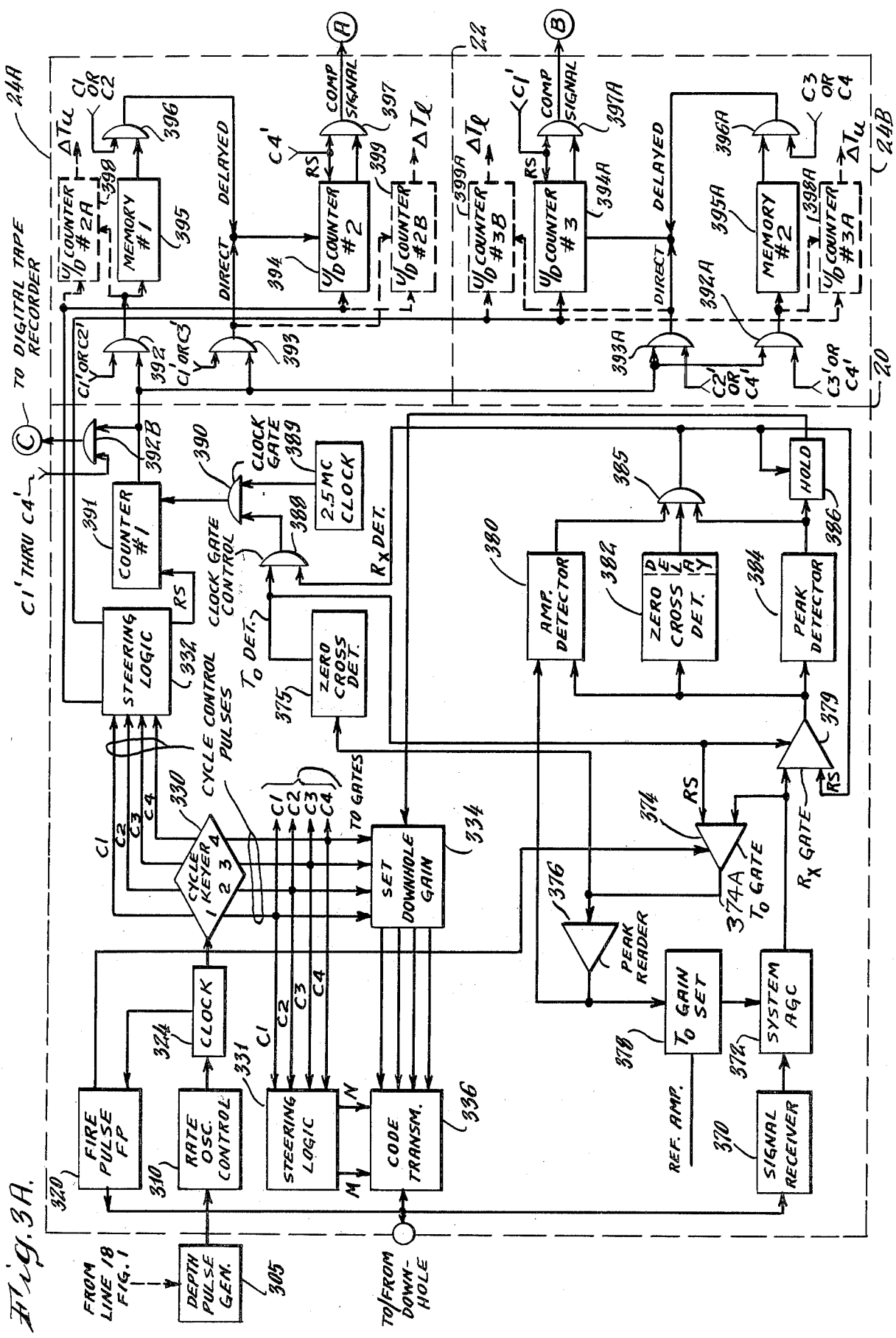
FIGS. 3A and 3B show surface and downhole circuitry in accordance with one embodiment of the present invention.
Figure 3B:
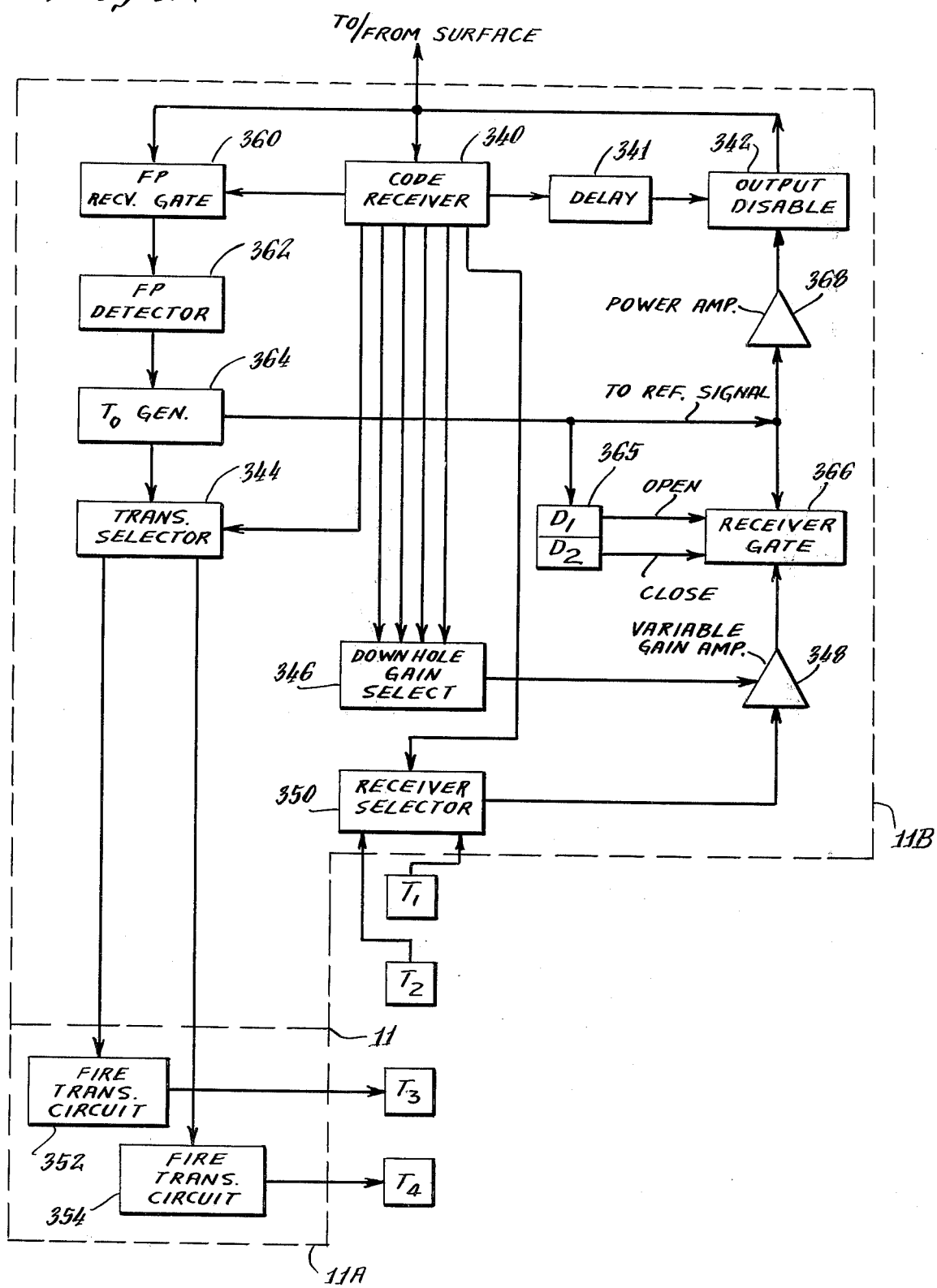

In FIGS. 3A and 3B, there are illustrated typical circuits for surface and downhole apparatus for performing transmitter and receiver selection, acquisition and combination of individual measurements in accordance with the present invention. While these circuits are illustrated for providing compensated acoustic travel time measurements, similar circuits may be used for compensated amplitude ratio measurements, for example, by modifying the circuits of FIGS. 3A and 3B to also acquire signal amplitude or gain setting information along with the time measurement information. The amplitude information may be processed in accordance with the teaching of the previously discussed Zill patent.

A general description of the operation of the apparatus of FIGS. 3A and 3B will be given followed by a detailed description.

In general, the measurement sequence commences with a depth pulse corresponding to a depth increment and then clocking the individual transmitter and receiver selection cycles to complete the sequence. Four cycles and corresponding logic modes are shown in Table II below to select either transmitter $T_3$ or the more distant transmitter, $T_4$, and receiver $T_2$ or the more distant receiver, $T_1$.

These logic modes, denoted M and $\overline{M}$ or N and $\overline{N}$, are used to select respectively the appropriate transmitter or receiver as will be described later. The travel path portions given in Table II for each of the measurements are illustrated in FIG. 4A (to be discussed later) and apply as well to either the contact skid embodiment shown or to a mandrel embodiment.

TABLE II

| CYCLE NO. | MODE | | TRANS. | RECR. | PATH | | | | | MEAS. |
|---|---|---|---|---|---|---|---|---|---|---|
| 1 | M | N | $T_3$ | $T_2$ | A | + B | | | + D | $m_1$ |
| 2 | M | $\overline{N}$ | $T_3$ | $T_1$ | A | + B | + C | | + E | $m_2$ |
| 3 | $\overline{M}$ | N | $T_4$ | $T_2$ | F | + G | | | + H | $m_3$ |
| 4 | $\overline{M}$ | $\overline{N}$ | $T_4$ | $T_1$ | F | + G | + I | | + J | $m_4$ |

The selected transmitter is fired and the propagated signal received at the selected receiver, amplified with a gain setting appropriate for the particular T-R cycle and transmitted uphole. A reference timing pulse is generated in a fixed time relationship to the time of firing the transmitter and used as a basis for compensating signal losses in the cable and as a time reference point to gate the signal detection circuits used for detecting the time of arrival of the received signal. Time measurements are performed by gating clock pulses into a counter beginning with the transmitter firing reference pulse and stopping with the detection. The counter's contents then become the individual measurements m already discussed in regard to the previous figures. These measurements are stored or recorded according to their cycle position for later processing.

For a detailed description, refer now to FIG. 3A. The sequence begins with a depth pulse from depth pulse generator 305 starting a rate oscillator control 310 and clock 324. The oscillator 310 and clock 324 cooperate to generate control signals at a rate such that several complete sequences of four cycles each will be performed per second. Clock pulses are fed to cycle keyer 330, which generates four cycle control pulses utilized as binary states of M and N; i.e., M, $\overline{M}$, N and $\overline{N}$ by steering logic to produce mode signals representing the modes of Table II. Cycle control pulses are used to synchronize steering logic 331 and 332 to select a new T-R combination, and to synchronize downhole gain system 334 to establish the gains appropriate for the received signals of each cycle.

Referring to FIG. 3C, a timing diagram is shown to illustrate time relationships between clock pulses (on line 1) from clock 324, M and N binary mode signals (2 and 3) from steering logic 331, cycle control pulses (4, 6, 8 and 10) and their delayed counterparts (5, 7, 9 and 11, respectively) from cycle keyer 330 and counter reset and up/down steering control pulses (12, 13 and 14 for counters #1, 2 and 3 respectively) from steering logic 332, used in the surface circuits shown in FIG. 3A to synchronize downhole circuits shown in FIG. 3B.

While the actual circuits, such as square wave generators, for example, which may be used to generate these signals and pulses and their delayed counterparts are not shown for simplicity of the circuit diagrams, how to make these circuits is well known to those in this art. Similarly for clarity of the diagrams, not all the connections between various circuit components using these signals and pulses to enable gates, select codes, reset counters and the like are shown. The identity of each or alternative signals and pulses is shown where appropriate.

From FIG. 3C, it can be seen that a depth pulse starts a series of clock pulses 1-9 (shown on line 1) to define one complete measurement sequence as previously described in regard to FIG. 2 and Tables I and II. On the initial clock pulse, mode signal M selects $T_3$ (line 2) and N selects $T_2$ (line 3) to begin the C1 cycle to produce $m_1$. Counter #1 (shown at 391 in FIG. 3A) may be reset (RS) (as shown at line 12 in FIG. 3C) on the upward edge of the steering pulse from steering logic 332.

Thereafter, counter #1 will start counting clock pulses from high frequency clock 389 when gated to it via clock gate 390 during the initial portion of cycle C1 (line 4). Normally, counter #1 is stopped by receiver signal detection before the end of this portion at clock pulse 2, and if not, this pulse or a delayed pulse C1' may be used to stop counter #1, but its contents would be invalid in this case.

Up/down counters #2 and #3 are shown at 394 and 394A in circuits shown as 24A and 24B respectively in FIG. 3A, and are used in conjunction with memories #1 and #2 also shown there to combine the particular measurements for each counter in the up (+) or down (−) mode as indicated on lines 13 and 14 respectively of FIG. 3C. Similar counters #2A, #2B, #3A and #3B are shown in dashed lines in circuits 24A and 24B of FIG. 3A.

For example, counter #2 of circuit 24A of FIG. 3A is shown (line 13) in a count down mode at clock pulse 1 and, as will be described in detail later, counts down during the initial part of cycle 1 when $m_1^*$, the * indicating the measurement was depth delay or memorized from a previous $m_1$ measurement at a deeper depth, for example, is input from memory #1, then at clock pulse 2, while still in the down mode, the current $m_1$ is input to counter #2 direct from counter #1; i.e., without delay or memorization since counter #1 contains the current measurement after the initial part of each cycle. Thus, at clock pulse 3, counter #2 has accumulated $-m_1^* - m_1$ and is then switched to a count up (+) mode. Then during the initial part of cycle 2, $m_2^*$ is input from memory #1 to add $+m_2^*$ and, during the latter part of cycle 3 (at clock pulse 6) the current $m_3$ counted during the initial part of cycle 3 is input from counter #1 to add $+m_3$ to the prior accumulation in counter #2.

At the end of cycle 3, counter #2 contains $-m_1*-m_1+m_2*+m_3$, which have been input in that order. Subsequently, at a convenient time (shown as during cycle 4 on line 13 in FIG. 3C), counter #2 may be output and reset (RS) to begin at the next depth pulse, as another sequence as described above at clock pulse 1. As will be explained later, and as shown in FIGS. 1 and 3A at A, this combination of measurements corresponds to one of the borehole compensated measurements provided by the techniques of this invention.

Up/down counter #3 shown as 394A in circuit 24B of FIG. 3A is similarly diagrammed in FIG. 3C on line 14. However, its sequence begins after clock pulse 3 rather than clock pulse 1, as for counter #2 discussed above. At the start of cycle 2 with clock pulse 3, counter #3 begins, by switching to the down mode. Then during the latter part of cycle 2, and during the initial part of cycle 3, $-m_2$ and $-m_3*$ are input. Then at clock pulse #7, counter #3 is switched to the up mode and $+m_4*+m_4$ input from memory #2 and direct from counter #1, respectively during cycle 4. Thus, at the end of cycle 4, counter #3 contains $-m_2-m_3*+m_4*+m_4$. As shown in FIG. 3C on line 14, contents of counter #3 may be output during the following cycle 1 and counter #3 then reset (RS) and switched to the down mode to begin its sequence again at clock pulse 3. As will be described later, and as shown in FIG. 3A at B, this combination of measurements corresponds to another of the borehole compensated measurements provided by the techniques of this invention.

Cycles 1 through 4 shown in FIG. 3C are summarized in Table III and will be further discussed in its description later. With the general use and timing of the control signals, mode pulses, counters and memories now described, the particular circuits of FIGS. 3A and 3B will be described. The M and N mode select signals generated for each cycle by steering logic 331 will be used as the first two bits of a code signal.

At the start of each cycle, a code signal is transmitted from code transmitter 336 in FIG. 3A downhole to code receiver 340 in FIG. 3B. The code signal may contain as few as six bits of information designating which of the two transmitters (one bit), which of the two receivers (one bit), and which of 16 gain settings (four bits) are to be used. Additional bits for additional gain or attenuation settings may be desirable to increase gain resolution when amplitude/attenuation measurements are also being made.

Now concerning the operation of the downhole circuits, refer to FIG. 3B. In general, code transmission results in connecting the selected transmitters and receivers to appropriate downhole circuits and setting the downhole gain. Next, the selected transmitter is fired and the timing count begins. An automatic gain control system is used to standardize the signal amplitudes by varying the gains for each different T-R cycle.

Now discussing the detailed operation of the downhole circuits of FIG. 3B, the code signals from code transmitter 336 are received by downhole code receiver 340 in circuit section 11B shown in FIG. 3B, and a code bit representing the M or $\overline{M}$ mode is routed to the transmitter selector 344 which connects either firing circuit 352 or 354 to $T_3$ for M or $T_4$ for $\overline{M}$, respectively. Similarly, the N or $\overline{N}$ bit is routed to the receiver selector 350 and either receiver $T_2$ for N or $T_1$ for $\overline{N}$ is connected through receiver selector 350 to variable gain amplifier 348.

Gain bits in the signal code (four illustrated) are routed to downhole gain selector 346 which uses these bits to connect selected fixed attenuators and gain amplifiers to provide the desired gain represented by the code. The resulting 16 possible gain variations are shown for simplicity as represented by variable gain amplifier 348 controlled from gain selector 346. The gain will be determined automatically by analysis of the received signals as will be explained later but for now it will suffice to appreciate that longer T-R distances, as for example, $T_4$ to $T_1$, are given relatively higher gains than the shorter T-R distances like $T_2-T_3$.

Reception downhole of a given code by code receiver 340 also causes conditioning of fire pulse receiver gate 360 to interpret the next downhole transmission as a fire pulse command. Through an appropriate delay provided by delay 341, reception of the code also enables previously disabled downhole output gate 342 to then allow uphole transmission of output from power amplifier 368, which might have previously interfered with the code transmission. Thus, it can be seen that the downhole circuitry of FIG. 3B uses the code to condition associated electronics to connect the appropriate transmitters and receivers and set the desired gain and gates in expectation of a subsequent fire pulse command.

Returning to FIG. 3A, the uphole circuits are enabled synchronous with the operation of the downhole logic, to provide the firing pulse and receive the associated reference pulse and subsequent receiver signal. Cycle keyer 330 shown in FIG. 3A generates, for each cycle, a signal that is sent to steering logic 332 that in turn generates signals to reset to zero a first counter 391 and, depending upon the particular cycle, $C_1$ through $C_4$, to provide various gating signals to gates, counters and signal processing circuitry, most of which has already been described in relation to FIG. 3C.

Delayed control pulses from cycle keyer 330 divide each cycle into subcycles for detection and automatic gain determination, and gating completed current measurements or previously stored measurements into the signal processing apparatus 24 of FIG. 3B, as appropriate for the particular cycle. For example, when signal processing circuitry 24A and 24B is utilized, these steering signals may be used to clear counter 394 and 394A and condition them to process the next input by counting down or, if the input is a digital word transfer, to combine the word with a negative sign. Subsequent steering signals cause these counters to accept further input by counting up or adding to the previous contents.

Besides providing clock pulses which begin each cycle to cycle keyer 330, clock 324 also provides, after a suitable delay, a control pulse to fire pulse circuit 320. This delay, provided by circuits internal to clock 324, is such as to allow time for both the downhole and surface circuitry to be conditioned, as already described, to receive the fire pulse. With the downhole and uphole circuits ready, this delayed clock pulse causes fire pulse circuitry 320 to initiate a fire pulse command (FP) which is transmitted downhole and properly interpreted by the previously conditioned fire pulse receiver gate 360 shown in FIG. 3B.

Returning to FIG. 3B, the fire pulse command is gated through to fire pulse detector 362 and upon detection, causes $T_0$ generator 364 to initiate a downhole firing pulse. This causes transmitter selector 344, previously connected to selected transmitter firing circuits, 352 for $T_3$ on mode M or 354 for $T_4$ on mode $\overline{M}$ (see Table II), to fire the selected transmitter, $T_3$ or $T_4$. The $T_0$ generator 364 also initiates a $T_0$ pulse for use as a reference signal both by downhole and surface circuitry. For surface use, the $T_0$ pulse is transmitted uphole via power amplifier 368 and through the now enabled output gate 342 to signal receiver 370 and system automatic gain control 372 located at the surface (see FIG. 3A).

At the surface, the $T_0$ pulse is used as an amplitude reference. Since it is established downhole by $T_0$ generator 364 with a standard reference amplitude, the system automatic gain control 372, $T_0$ gate 374, peak reader circuit 376 and $T_0$ gain set control 378 (shown in FIG. 3A) are utilized to re-establish at the surface this standard amplitude reference. Thus, this internal system control provides compensation for cable losses, phase distortion, drift, etc.

The $T_0$ pulse is gated via $T_0$ gate 374, which has been previously conditioned to allow $T_0$ through to peak reader 376 via line 374A. This conditioning is synchronized with the operation of fire pulse circuit 320. The peak amplitude of surface received $T_0$ pulse is read by peak reader 376 and compared with a reference amplitude by $T_0$ gain setting circuitry 378 which adjusts, if necessary, the automatic gain control circuit 372 to re-establish the amplitude for subsequent $T_0$ signals to the reference amplitude level. Additional signal conditioning circuitry may be included for cable losses using this known $T_0$ signal standard.

The peak $T_0$ amplitude read from peak reader 376 is also provided to an amplitude detector 380 as an amplitude reference for use in detecting the receiver signal which will follow $T_0$, as will be explained.

The $T_0$ pulse provides an accurate time reference related to the transmitter firing. This time reference is determined by a zero crossing detector circuit 375 connected through $T_0$ gate 374 to consistently detect the $T_0$ zero crossing point. This $T_0$ detection point is used as a beginning for the time measurement by providing a time-related $T_0$ detection signal as a start signal clock gate control 388 of FIG. 3B which enables a clock gate 390 to pass high frequency clock pulses from clock 389 to counter #1 which, having been previously set to zero, begins counting the clock pulses. The clock pulses should have a high enough frequency, for example, 2.5 megacycles, to provide the desired time resolution. The $T_0$ detection signal is used in turn to gate off the $T_0$ gate 374 and gate on a received signal detector gate 379 such that subsequent signals will be interpreted as the next expected receiver signal. With the uphole apparatus of FIG. 3A already beginning the time measurement at the start of the clock pulse counting, refer now to downhole circuits shown in FIG. 3B.

The $T_0$ signal generated by $T_0$ generator 364 is delayed by delays D1 and D2 provided by delay circuit 365, as shown in FIG. 3B, and used to respectively open and close a receiver gate 366 for a time interval corresponding to the expected arrival time of the received signal. These delays will understandably vary with the design distance between the transmitter and receiver and can be determined in a well known manner.

After propagation in the formation, the acoustic pulse transmitted from the selected transmitter is propagated through the borehole and formation and received by the selected receiver, which has been previously connected through receiver selector 350 to an already set variable gain amplifier 348. The selection and gain setting was discussed earlier in regard to the operation of code receiver 340. The received signal is allowed through receiver gate 366 now enabled as described above to the previously described power amplifier 368 and still open output gate 342 where it is transmitted to surface circuitry shown in FIG. 3A.

Returning again to FIG. 3A, the amplified receiver signal, here denoted as $R_x$, is received at the surface and reconditioned at signal receiver 370 and amplified by system AGC 372, already described, to provide a cable compensated amplitude. It is then gated through a receiver detector gate 379, previously conditioned by a $T_0$ detection signal generated by zero crossing detector 375 to allow the signal to pass to detection circuits 380 through 384.

Figure 9A:
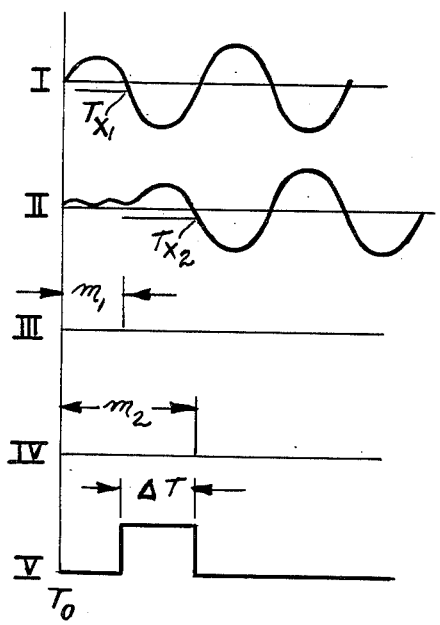
FIGS. 9A and 9B show the relationship between different measurements of physical characteristics of subsurface media.

As illustrated in FIG. 3A, the arrival of the received signal $R_x$ is detected by simultaneously comparing $R_x$ amplitude in amplitude detector 380 with a $T_0$ reference amplitude supplied by peak reader 376 and examining $R_x$ with a zero crossing detector 382 and a peak detector 384. A typical $R_x$ signal is shown in FIG. 9A and has positive and negative half-cycles which increase in amplitude during the first few half-cycles. As illustrated in the circuits of FIG. 3A, three conditions are required for detection: (1) a zero crossing must be detected by zero crossing detector 382, this detection being delayed internally by a delay corresponding approximately to one half-cycle; (2) the subsequent amplitude of $R_x$ as compared by amplitude detector 380 must exceed a small fraction of the $T_0$ reference amplitude; and (3) an $R_x$ amplitude peak must be detected by peak detector 384 within the half-cycle delay following the zero crossing detection. All three detection indications are provided to AND gate 385, such that the first occurrence of an amplitude exceeding a threshold amplitude referenced to the $T_0$ amplitude which is preceded by a zero crossing in the appropriate polarity, and which is followed by an amplitude peak of the same polarity within the half-cycle delay, completes the detection.

An $R_x$ detection indication is output from AND gate 385 and causes hold circuit 386 to hold the peak amplitude detected by peak detector 384 for use in setting the downhole gain for subsequent reception with the same transmitter-receiver combination in cooperation with downhole gain setting circuit 334. Independent gain settings are made and stored in the downhole gain setting circuit 334 for subsequent use with corresponding cycles. Further, these gains are determined on the same part of the signal used for the measurement. A further description of this automatic gain setting technique is provided in copending U.S. patent applications Ser. Nos. 528,693, filed on Dec. 2, 9174 now U.S. Pat. No. 4,040,001 and 528,694, continued as 678,643, filed on Apr. 20, 1976 now U.S. Pat. No. 4,172,250.

The $R_x$ detection signal output from AND gate 385 is used to reset the receiver signal gate 379, previously described, and, more importantly, to cause clock gate control 388 to gate off clock pulses coming from clock 389. These pulses had been gated on earlier to counter 391 by means of the clock gate 390 by the $T_0$ detection as previously described. Thus, the $T_0$ and $R_x$ detection are used to cause the determination of a clock pulse count corresponding to the time measurement for this given cycle. In this manner, the counter #1 now contains the number of 2.5 megacycle clock pulses corresponding to the travel time relative to the $T_0$ and received signal detections. The counts contained in counter #1 may be in turn regarded as the individual time measurement corresponding to the particular measurement cycle such as $m_1$ for cycle 1, $m_2$ for cycle 2, etc. The contents of counter #1 at the completion of the counting may then be transferred through various gates to utilizing devices at the times shown in FIG. 3C, as provided by appropriately delayed control pulses C' from cycle keyer 330.

For example, where the individual measurements are to be recorded for later processing, the delayed control pulses $C_1'$ through $C_4'$ each cause the counter contents, corresponding to $m_1$ through $m_4$, respectively, to be gated through gate 392B to a suitable recording device connected at point C such as a digital tape recorder, not shown.

Alternatively, particular cycle control pulses are used to selectively gate the counter contents into the memory and counter circuits 24A to provide one compensated signal, and to similar circuitry in 24B if two different spacing compensated signals are desired. These circuits accomplish the relationships for combining individual measurements illustrated in Table III below:

TABLE III

| CONTR. PULSE | GATE MEAS. | CONNECTION FROM | CONNECTION TO | CONTENTS OF COUNTERS C#1 | C#2 | C#3 |
|---|---|---|---|---|---|---|
| C1 | $m_1$* | M#1 | C#2 | | $-m_1$* | B |
| C1' | $m_1$ | C#1 | M#1 C#2 | $m_1$ | $-m_1$ $-m_1$* $+m_2$* | OUTPUT RESET |
| C2 | $m_2$* | M#1 | C#2 | | $-m_1$ $-m_1$* | |
| C2' | $m_2$ | C#1 | M#1 C#3 | $m_2$ | | $-m_2$ |
| C3 | $m_3$* | M#2 | C#3 | | $-m_3$* | $-m_2$ |
| C3' | $m_3$ | C#1 | M#2 C#2 | $m_3$ | $+m_3$ $+m_2$* $-m_1$ $-m_1$* | |
| C4 | $m_4$* | M#2 | C#3 | A | $+m_4$* $-m_3$ | $-m_2$ |
| C4' | $m_4$ | C#1 | M#2 C#3 | $m_4$ | OUTPUT RESET $+m_4$* $-m_3$* | $+m_4$ $-m_2$ |

*measurement from previous position

Table III above illustrates the general cycle for each measurement m. During the primary portion of the cycle, here denoted as subcycle C, clock pulses are being accumulated in counter #1 (C#1) for the new measurement at the current depth $d_J$, for example, as illustrated in FIGS. 2A and 2B. The corresponding measurement m* made at the previous position $d_I$ in the illustrative example, is transferred from memory M to a second counter which has been previously conditioned for this cycle to count down or subtract; or count up or add; for example. This makes room in memory for current measurement such that memory need only have a capacity for the number of measurements acquired between $d_I$ and $d_J$ because the current measurement m (at $d_J$) may replace the measurement m* (stored at $d_I$).

The next subcycle C' begins after a long enough delay has been provided to allow the completion of the current measurement; i.e., after the expected signal has been received from downhole and detected and C#1 has stopped counting. Then m is gated from C#1 to memory M, replacing the corresponding previous measurement m*. During subcycle C', m is also gated to the particular second counter C#2 or C#3 for this cycle. As illustrated for the two compensated measurements A and B, each m goes in turn to one memory M and one additional counter; e.g., $m_1$ goes to M#1 and C#2; $m_2$ to M#1 and C#3; $m_3$ to M#2 and C#2 and $m_4$ to M#2 and C#3. Thus, each M stores two different m's and the counters C#2 and C#3 combine two current m's and two previously stored m*'s.

From examination of FIGS. 3A and 3B and Table III above, it is readily seen that both the measurements and apparatus components serve multiple uses. The same control, amplifiers, cable compensation, automatic gain system, time reference, detection circuitry, high frequency clock and clock pulse counter are employed for each individual measurement. This not only provides lower cost apparatus but provides compensation for systematic measurement errors, as will be explained in more detail later. For now, it need only be appreciated that if a component inaccuracy causes $m_1$ to be in error, $m_2$, $m_3$ and $m_4$ will also be in error by the same amount in the same direction. However, in accordance with the advantages of this invention, when these systematically erroneous measurements are combined as illustrated above, these errors will be compensated out just as a systematic error induced by sonde tilt, for example, is compensated.

As previously discussed and as illustrated in Table III, various measurements are typically used twice, first in reference to the receivers and then with the transmitters. Steering logic 332 provides the control pulse mode signals allowing the contents of counter #1 to be transferred to the gated memories or counters used to perform the measurement combinations. For example, at the completion of the first measurement $m_1$ cycle which corresponds, as indicated by Table II, to the $T_3-T_2$ measurement, as illustrated in FIG. 3A, the clock control pulse C1 or, preferably, a delayed version of it, C1', as in Table III above, may be utilized to gate the counter contents to memory in circuit 24. Preferably the earlier C1 pulse is used to gate out a previously stored measurement from memory. The timing relationships for various M, N, C and C', (delayed) states and combinations for the associated measurements $m_1$ through $m_4$ have already been described in regard to FIG. 3C. These relationships will be detailed now in regard to the particular circuit components.

Memory is utilized to delay measurements m* made at an earlier position such as at $d_I$ illustrated in FIG. 2, so that they may be combined with current measurements which are in counter #1. In the preferred arrangement, counter #1 contents are gated through gate 392 to memory #1, both at the completion of cycle #1 and cycle #2, to store measurements $m_1$ and $m_2$. After the number of complete cycles corresponding to the movement of the transducer array from the position illustrated as $d_I$ to the position illustrated as $d_L$ in FIG. 2A have been stored, these measurements are available from the output of memory #1 such that control pulses provided to gate 396 gate out these previously stored measurements for utilization in counter #2. In this manner, C1' would cause $m_1$ at $d_I$ and C2' similarly cause $m_2$ at $d_I$ to be gated through gate 392 into memory #1 in serial arrangement. This memorization process of $m_1$ and $m_2$ in memory #1 continues until, for example, at $d_L$, the previously memorized measurements become available as output of the memory. At this time control pulse C1' would continue to provide new $m_1$ measurements to memory as well as to counter #2 through gate 393.

As already explained, counter #2 has been previously conditioned prior to C1 to interpret subsequent input in a countdown or negative sense. Thus, when C1 is supplied to memory #1 output gate 396, $m_1^*$ corresponding to previously stored $m_1^*$ measurement at $d_I$ is gated to counter #2. Then, at a delayed version of C1 denoted C1', the current $m_1$ is also gated to counter #2 and to memory. In this manner, $m_1^*$ at $d_I$ and $m_1$ at $d_L$ are gated to and combined at counter #2 in the same sense; i.e., either by continuing to count down for their combined count or added with negative signs. Thus, in counter #2 at the end of the C1 cycle is $-m_1$ at $d_L - m_1^*$ at $d_I$. The next clock cycle C2 would add $m_2^*$ at $d_I$ through gate 396 to counter #2, but now conditioned to consider input in a positive or count up sense. Then the current $m_2$ at $d_L$ would be stored. Thus, at the end of a C2 cycle, counter #2 would contain $m_2^*$ at $d_I - m_1$ at $d_L - m_1^*$ at $d_I$. During the next clock cycle C3, measurement $m_3$ at current depth $d_L$ would be gated through gate 393 to counter #2 still in its add mode such that the result becomes $m_3$ at $d_L + m_2^*$ at $d_I - m_1$ at $d_L - m_2^*$ at $d_I$. Then, at a subsequent convenient clock pulse, illustrated here as C4', the contents of counter #2 is gated out through gate 397 to point A as the compensated signal. Where the transmitter-receiver selection has been in accordance with Table II, compensated signal A corresponds to a short T-R distance investigation. Counter #2 is subsequently reset and the processing for another compensated signal sample corresponding to the next sequential depth increment begun in the above described manner.

For a long T-R distance investigation B, corresponding circuitry 24B, shown in FIG. 3A with separate memory #2 and counter #3 and corresponding gates, may be utilized. In 24B, these components have been designated with the same numbers used in 24A but now include an additional designation "A". Of course, these "A" gates are controlled by different control pulses as indicated therein since they involve different measurements obtained at different times. Like the timing diagram of FIG. 3C for the timing of the circuits shown in FIG. 3A, Table III summarizes the operations of both circuits 24A and 24B in terms of the control pulses, senses and contents of the various counters and memories illustrated in FIG. 3A and used to derive the two compensated signals, A and B.

It will be realized where both A & B are desired, memories 1 and 2 may be readily combined since their input and output functions occur at separate control pulses and measurements $m_1$ through $m_4$ may be stored in that order and retrieved in that same order. One suitable memory is described in U.S. Patent Application Ser. No. 571,497 by Y. Durand filed Apr. 25, 1975, now U.S. Pat. No. 4,040,002, (a continuation of Ser. No. 384,228 filed July 31, 1973). Each time a new measurement, as for example, $m_1$ is ready, the oldest corresponding measurement is retrieved from storage such that the newest measurement may replace the oldest measurement and the memory managed on a replacement basis, thereby conserving the memory capacity.

It will be readily recognized how the additional measurements $m_2$ through $m_4$ may be acquired and utilized from the description of $m_1$ above, the control logic and definitions to acquire these measurements being provided by Table II and the processing logic being provided by Table III. It should be realized that the invention may be practiced by providing a single compensated measurement, here illustrated as either A or B, therefore employing only a single memory or additional counter other than counter #1. In this case, two measurements may be combined as acquired and only the result stored. The two current measurements would not need to be stored.

It also should be realized that the processing provided by circuits 24A and 24B may be provided by a digital microprocessor with its normally associated memory replacing memories 395 and 395A and its arithmetic registers replacing counters 394 and 394A, its control program utilizing the control pulses to perform the indicated transfers to and from memory and the registers. As previously stated, these processes may also be provided by utilizing output C recorded on a digital tape recorder which is subsequently produced as input to a general purpose digital computer and processed with an equivalent control program.

Referring now to FIG. 4A, there is illustrated a transducer skid support which is tilted from the desired wall contact position parallel to the borehole wall. Such tilt may be due to a variety of mechanical problems associated with the skid to mandrel linkage, inadequate sidewall pressure, etc. Unfortunately, when this tilt problem occurs, it may not be reflected in linkage caliper or pressure measurements. However, in accordance with one feature of this invention, not only can the tilt be detected but its effect compensated.

The transducer array shown in FIG. 4A is arranged as was assumed for illustration in FIGS. 2A and 2B; i.e., the receiver pair $T_1$ and $T_2$ is on the top and the transmitter pair $T_3$ and $T_4$ is on the bottom of the skid.

As denoted in Table I already described, four measurements are made between different combinations of these transducers. Two binary modes M and N are used to code the transmitter and receiver selection which control the signal paths. In accordance with one advantage of the novel transducer array, compensation for borehole path length differences due to either tilt or borehole washout between the near and far transducers in the pair is provided by reversing the sense of the near and far transducer measurements; i.e., the far transducer becomes the near transducer and vice versa. This ability is provided by utilizing a pair of transmitters in the same sense that a pair of receivers are used to provide one of two sets of the transducer measurements. FIGS. 4A and 4B illustrate how this compensation is obtained for the skid type and FIGS. 4C and 4D for the nonskid type arrays.

Consider the paths shown in FIG. 4A and Table II. Signals leaving $T_3$ travel path A through the borehole to the formation and then towards the receivers along path B, reaching $T_2$ via borehole path D and $T_1$ via additional formation path C and borehole path E. If the borehole paths E & D are equal, the differences between the signals of $T_2$ and $T_1$ will be essentially a measurement of the travel through formation path C, corresponding to the interval between $T_2$ and $T_1$. If, however, path D is substantially different from path E, this distorts the short T-RR measurement thought to correspond to formation path C as in illustrated case where D is larger than E. The short-spacing travel time measurement $m_s$ equals $m_2 - m_1 = C + (E-D)$ because the common paths A and B subtract out. Ideally, $E = D$ and there would be no error. However, in the above illustrated case, the error equals their difference, $E - D$, which is negative, indicating travel time will be too short.

An error would also be present for the long T-RR measurement $m_l$ made relative to $T_4$, since the borehole path lengths H and J are also unequal. Here, $m_l = m_4 - m_3 = I + (J-H)$, since common paths F and G subtract out. As illustrated, H is larger than J, making the error due to their difference also negative, and indicating this travel time is also too short.

Despite the separation in paths illustrated in FIG. 4A, formation paths C and I for the formation interval between $T_2$ and $T_1$ and borehole paths D and H at $T_2$ are respectively almost the same, as are E and J at $T_1$. Even formations regularly varying in acoustic properties radially from the borehole wall can be assumed to still have nearly identical receiver borehole paths for signals received over either the long or short T-RR distances. Consequently, both the short-distance $m_s$ using $T_3$ and the long-distance $m_l$ and $T_4$ can be expected to have the same error.

Referring to FIG. 4C, consider the nature of the error when the transducer array is moved from position (a), when the receiver pair is adjacent interval I, to position (b), when the transmitter pair is adjacent interval I. The borehold paths for position (a) are denoted as in FIG. 4A and for position (b) by the same letter but primed; e.g., A and A' at $T_3$, respectively. With the interval of interest I between $T_3$ and $T_4$, the short-distance measurement for position (b) is $m'_s = m_3' - m_1'$ using $T_2$ and the long-distance measurement $m'_l = m_4' - m_2'$ using $T_1$. Referring to Table I, it can be seen that the error for both $m_s'$ and $m_l'$ is $F' - A'$. If F' is greater than A', the error is positive and thus in the opposite sense from the errors in position (a). As FIGS. 4B and 4D will show, the error is also of the same magnitude.

Consider FIG. 4B for the skid case shown in FIG. 4A, and recalling that position (a) errors were $(E-D)$ or $(J-H)$, it can be readily seen that since the tilt angle $\gamma$ is the same, the paths E or J at $T_1$ for position (a) taken in ratio to path A' at $T_3$ for position (b) is proportioned to paths D or H at $T_2$ for position (a) taken in ratio to F' at $T_4$ for position (b), due to the geometrical similarity. Thus, $(E-D) = -(F'-A')$ and in fact, the tilt angle $\gamma$, may be computed. If $m_s$ (or $m_l$) is less than $m_s'$ (or $m_l'$), the illustrated case of tilt is present where the upper pair of same-type transducers is closer to the wall than the lower pair. If $m_s$ is greater than $m_s'$, the reverse case would be indicated, This will be more fully appreciated from FIG. 4D.

In FIG. 4D, paths are illustrated with the transducers superimposed to show the differences in parallel paths A' and F' and paths E (or J) and D (or H). It can be seen that each path is related to the tilt angle $\gamma$, the distance from the wall contact point of the transducer array, and the refraction angle $\beta$. Since $\gamma$ and $\beta$ are constant and the distance separating like transducers is the same (here shown as I) it can be shown that the difference between path lengths for like transducers is also the same, such that $D - E$ (or $H - J$) $= F' - A'$.

From the above, it can be seen that measurements between first the receiver pair and then the transmitter pair reverses the sense of the tilt error introduced in these measurements.

Figure 5A:
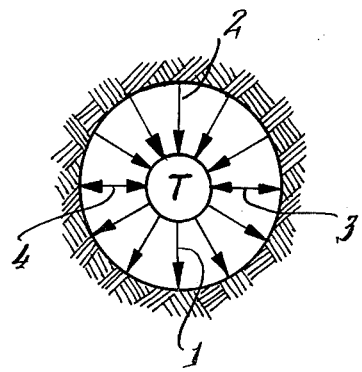
FIGS. 5A and 5B show different borehole operating environments that are compensated for in accordance with the present invention.
Figure 5B:
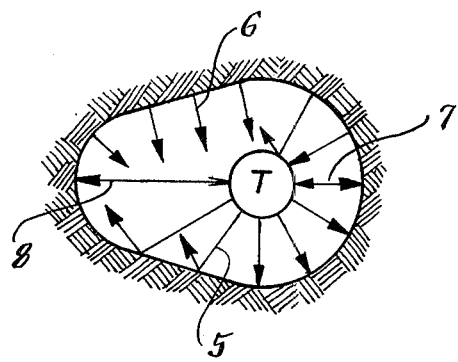

The effects of borehole shape rather than tilt is illustrated in FIGS. 5A and 5B. In FIG. 5A there is shown in horizontal section the ideal position of a transducer T; i.e., centered in a round hole. Path 1 from a transmitter and the path 2 to a receiver are of equal length as are all the paths around the circumference of the transducer. This causes the transmitted energies radiated in different directions to be received essentially at the same time and thus reinforce one another to provide the best signal amplitude and phase stability.

FIG. 5B shows the same transducer T parallel to the borehole wall as in FIG. 5A (not tilted) but now the borehole is noncircular, with the shape resembling two intersecting cylinders with different diameters and noncoincident centers. This shape is typically found in directional holes. It can be readily seen that the borehole paths 5 from a transmitter and 6 to a receiver not only vary in length but frequently do not even intersect the transducer. This results in a marked reduction of the transmitted energy coupled to the formation and a destructive out-of-phase relationship for the signals arriving at the receiver, since a signal traveling via path 7 will arrive much sooner than via path 8, for example. Consequently, large reductions in amplitudes are experienced under such conditions.

To a lesser degree, the above signal problem also occurs in tilt cases, since, in those situations, it is impossible to have all the transducers in the ideal position. For example, as illustrated in FIG. 4C, various degrees of eccentering, even in a round hole, would be present for each of the four transducers. Thus, measurements $m_2$ and $m_3$ would be equal under the ideal FIG. 5A conditions, but unequal under the out-of-round hole of FIG. 5B conditions or the eccentering associated with sonde tilt. In this manner, this comparison of different measurements at different depths may actually detect different transducer operating environment conditions such as caused by sonde tilt.

In the prior art T-RR-T arrays, the transmitters are located at extremes of the array. Thus, if tilt causes one end to eccenter, the two very much spaced apart transmitters operate under substantially different positions even in a round hole.

By comparison, same transducers in the TT-RR array described herein are closely spaced and operate advantageously in much the same positions with respect to the borehole wall.

As previously mentioned, it is desirable, particularly in acoustic investigations, to have long T-R distances to overcome the effects, for example, of shale alteration. The same desire exists in skid devices and in other types of measurements such as high frequency, electromagnetic investigations, etc.

Figure 6A:
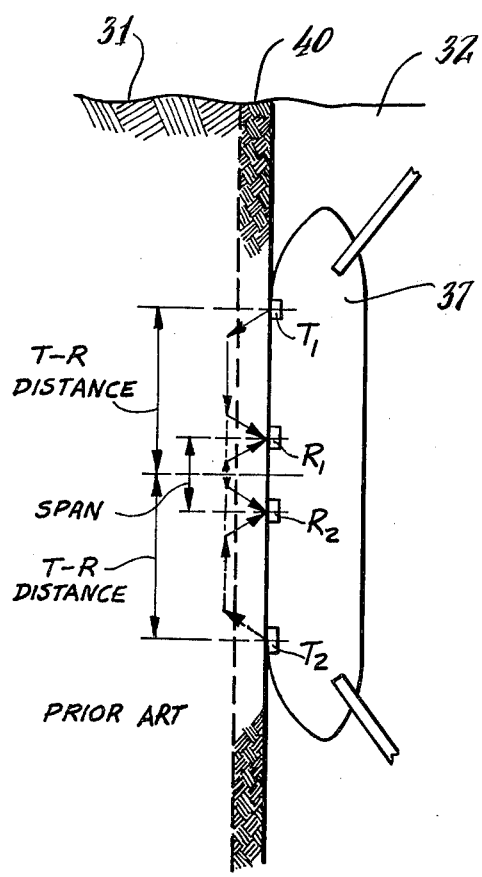
FIG. 6A shows a prior art skid mounted borehole compensation array and FIG. 6B shows the prior art array modified in accordance with the present invention.
Figure 6B:
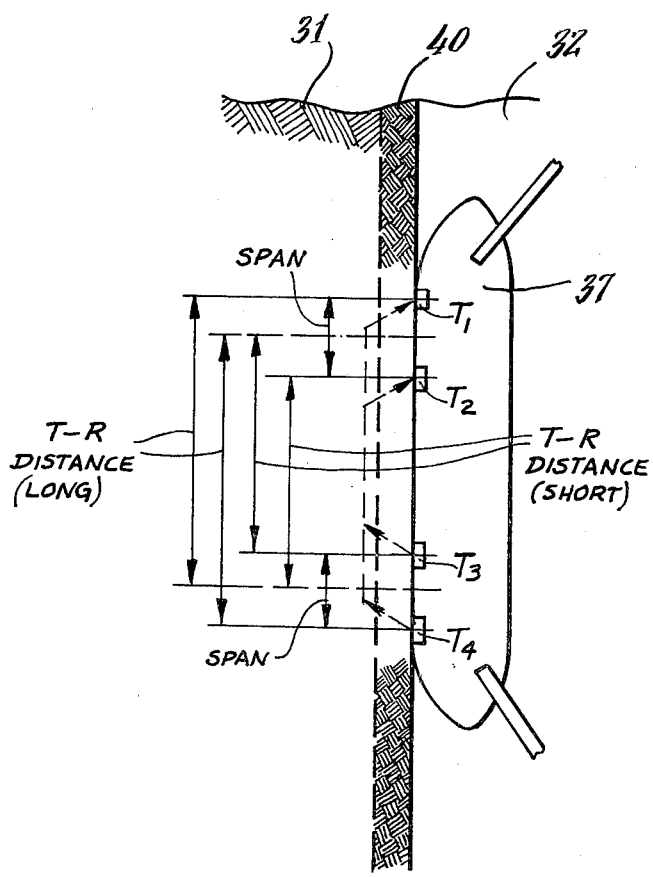

FIG. 6A illustrates one prior art borehole compensating array. The T-R distance is shown as occurring twice, first from $T_1$ and second from $T_2$ to the array midpoint between $R_1$ and $R_2$. For comparison, FIG. 6B illustrates the compensating array of the present invention, as applied to the sidewall skid. The same span or receiver investigation interval and skid length are used in both FIGS. 6A and 6B. However, for the same transducer array length, the novel array shown in FIG. 6B provides a substantial increase in the T-R distance even for the shortest T-R investigation. For the longest T-R investigation, this distance is the entire array length, less only one-half the span. In contrast, the maximum T-R distance of the prior art array is only one-half the entire array length. By the novel overlapping of both the short and long T-R distances, the array illustrated in FIG. 6B, constructed in accordance with this invention, provides not only longer T-R distances for the same array length, but provides two different T-R distances contained within this length. Typical span between like transducers for acoustic time measurements is one or two feet while the shortest T-R distances are at least four feet but preferably six or eight feet. Thus, the reduction in length obtained with the TT-RR array of this invention is on the order of six or more feet as shown graphically between FIGS. 7A and 7B.

Referring to FIGS. 7A and 7B, additional features of the invention are shown. In FIG. 7A, both circuit connections and the use of directional transducers in the prior art type of compensation array are illustrated. In order to use directional receivers, two separate sets of receiver pairs must be employed, $R_n$ and $R_f$ for receiving signals from the direction of $T_u$, the upper transmitter, and $R_n'$ and $R_f'$ for signals from $T_l$, the lower transmitter. Added to the complexity necessitated by the two extra receivers is the usual electronic noise problem associated with connections between the uphole circuits above the transducers to the bottom transducers. For the lower transmitter, for example, these connections must be strung through or around the upper transducers. A high voltage generator is usually located near one of the transmitters, here not shown but above $T_u$. In any case, one high voltage lead, here $F_l$, must be run past the receivers to the remote transmitter. High voltage pulses typically employed to fire such transducers must be shielded in order to prevent electrical crosstalk into the receivers or receiver leads $R_n$, $R_n'$, $R_f$, and $R_f'$, and even then crosstalk can become severe.

By comparing FIG. 7B illustrating the array according to the invention with the prior art array of FIG. 7A described above, it is readily apparent how the advantages of the inventive array can be used to overcome this electrical connection and crosstalk problem. Since both the transmitters are together and can be advantageously located on the same side of the receiver pair, no high voltage leads need pass near the receivers or the receiver electronics. The high voltage generator may be located below the receivers and their associated electronics. Thus, only a relatively low voltage DC supply needs to be connected from above. This arrangement provides good electrical signal isolation and freedom from cross talk into the much lower level receiver signals.

Further, the novel transducer arrangement will allow the use of both directional transmitters and receivers without the necessity of adding an extra pair of transducers to provide the needed directivity. Since both receivers are on the same side of both transmitters, each receiver and transmitter has a unique directivity requirement, requiring no additional transducers as in the prior art array. Still further, since the same pairs of transducers are always used, differences in additional pairs of otherwise needed transducers to obtain directivity in both directions will not occur to affect the measurement.

An additional advantage of the TT-RR type array is its ability to compensate for refraction effects. As apparent from the prior art compensation array shown in FIG. 7A, the signals approach the receivers from different directions and incliniations. This inclination is due to the well-known refraction effect which gives the appearance that the borehole signal path intersects the formation at an angle somewhat less than 90°, the actual angle depending upon the formation/borehole fluid velocity contrast.

Two pairs of receivers $R_n$ and $R_f$ and $R_n'$ and $R_f'$ respectively, are illustrated in FIG. 7A to accommodate the refraction effect. Each receiver is aimed with its most sensitive direction along a particular inclined borehole path. Each pair is displaced to more effectively match the position of the formation interval simultaneously under investigation between the two pairs. This displacement may be termed a refraction displacement and determines the small spacing between the two receivers illustrated therein, which are used to take the place of the usual single receiver for directed reception from above and below; i.e., between either of $R_n$ and $R_f'$ or $R_n'$ and $R_f$. Unfortunately, the refraction displacement varies not only with hole size but with formation velocity, such that a fixed spacing between these two receivers can be designed but for one displacement corresponding at best to a nominal borehole size, formation velocity, etc.

However, in accordance with this invention, variations in the refraction displacement can be compensated by varying the delay distance or number of depth increments between measurements made between the different same-type transducer pairs. As can be seen in regard to FIG. 7B, the lower pair of same-type transducers sees the formation interval slightly above the actual borehole depths for these transducers while the upper pair sees the intervals slightly below their actual depths. Thus, the refraction displacement compensation may be readily provided by simply adjusting the delay between measurements made between these pairs before their combination, as for example, decreasing the delay for larger displacements between the actual position and the effective position of a transducer caused by a larger borehole size, higher velocity formations, etc.

An additional feature of the invention may be seen by comparing the formation intervals investigated as shown in FIGS. 7A and 7B. In the prior art compensation arrays shown in FIG. 7A only interval I centered about its midpoint is investigated. Thus, this excludes any possibility of investigating the critical interval between this point and the bottom of the hole. However, as can be seen in FIG. 7B, the lower interval $I_l$ on the TT-RR array lies very near the bottom of the hole and can be investigated by measurements made between the bottom pair of transducers. While not compensated, both short and long T-R investigations can be made.

Circuits to provide the $\Delta t$ measurement from the upper and lower intervals, $\Delta t_u$ for $I_u$ and $\Delta t_l$ for $I_l$ are shown by dashed lines in FIG. 3A. For example, the $m_1$ and $m_2$ measurements gated to memory #1 via gate 392 may also be gated to up/down counter #2A shown at 398 in circuit 24A. This counter, like up/down counter #2 shown at 394, is directed by steering pulses from steering logic 332 to count down or load with a negative sign for $m_1$ during C1' and up or add with a positive sign for $m_2$ during C2'. Thus, at the end of C2', the contents of counter #2A are $m_2 - m_1$ for the interval currently between $T_2$ and $T_1$ or $\Delta t_u$. Since $m_2$ and $m_1$ are both referenced to the short-distance transmitter $T_3$, this is a short T-R distance $\Delta t_u$ as can be seen in FIG. 2A at position I. The timing and steering may be seen in FIG. 3C.

A long T-R distance $\Delta t_u$ is similarly provided using the remaining measurements in another up/down counter #3A shown at 398A of FIG. 3A. This counter, steered like up/down counter #3, with $m_3$ and $m_4$ input from gate 392A in circuit 24B provides $m_4 - m_3$ for the interval currently between $T_2$ and $T_1$ or $\Delta t_u$ as can be seen in FIG. 2B at position I.

For position L, and the lower interval $I_l$, the short T-R distance $\Delta t_l$ is provided by up/down counter #2B at 399, steered like counter #2 with $m_1$ and $m_3$ input from gate 393 to provide $m_3 - m_1$; and for the long T-R distance $\Delta t_l$, by up/down counter #3B at 399A steered like counter #3 with $m_2$ and $m_4$ input from gate 393A in circuit 24B. Thus, long and short T-R distance $\Delta t$ investigations are provided for both the upper and lower intervals shown in FIG. 7B.

Although neither $\Delta t_u$ nor $\Delta t_l$ is borehole-compensated, they are obviously useful to log the borehole intervals respectively present just below the casing and at the bottom of the borehole. When used together, they are useful as borehole compensation indicators, since their difference indicates the degree of tool tilt; e.g., $\Delta t_u < \Delta t_l$ corresponds to the FIG. 4C illustration.

Figure 8A:
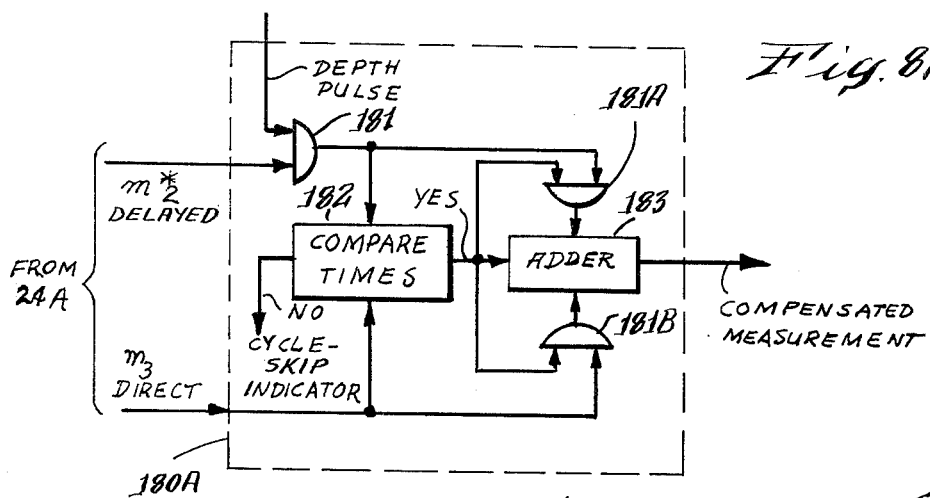
FIGS. 8A and 8B show alternative circuitry for use with circuit 24 of FIG. 3A.
Figure 8B:
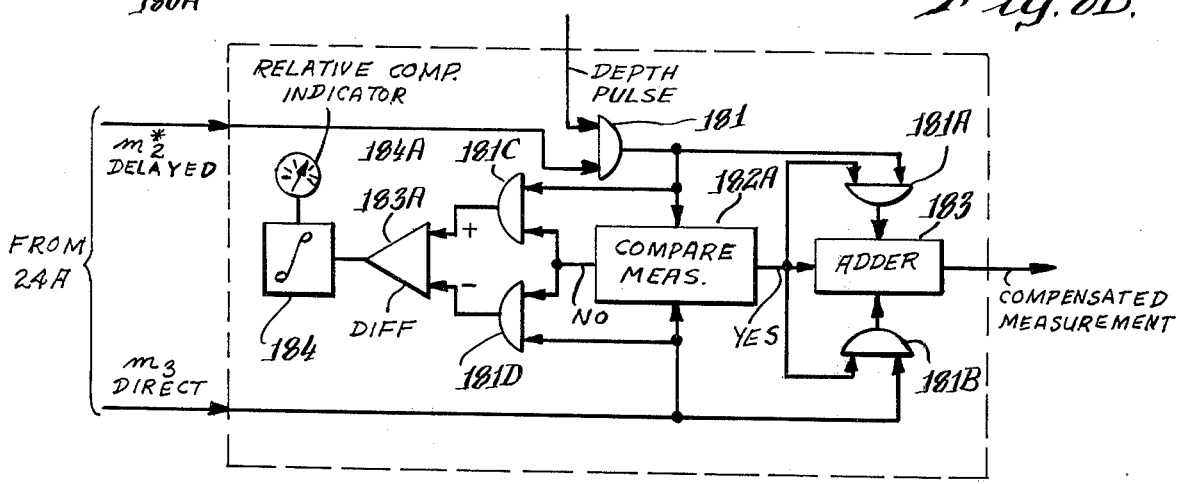

Referring to FIGS. 8A and 8B, there is shown alternative circuitry for one section of signal compensation circuit 24, previously described in connection with FIG. 3A. As previously mentioned, it is sometimes advantageous to compare, as well as to combine, the measurements. By comparing different measurements that should be substantially the same, for example, measurements between different transmitter-receiver pairs over the same interval in the borehole, certain borehole operating conditions that cause the measurements to vary may be detected. If the measurements compare to a reasonable degree, their differences may be attributed to statistical variations such that they may be combined to produce an improved or compensated measurement. However, if the comparison disclosed an unreasonable difference, the operating condition causing the error may be indicated.

Accordingly, a circuitry illustrated in FIG. 8A allows, upon the occurrence of a depth pulse, gating at 181 of delayed measurement m* corresponding to a previous position and transducer combination available at the output of memory, as shown in FIG. 3A, to be passed to comparator 182. Similarly, the current measurement m directly comparable to the memorized measurement m* is also input to comparator 182.

If, for example, the delayed input corresponds to $m_2$ at $d_I$ and the direct input corresponds to measurement $m_3$ at $d_J$, as illustrated in FIG. 2C, it may be expected that under normal conditions the measurements would be substantially equal. However, if a detection error has occurred in one of the measurements, a substantial difference will be noted.

As shown in FIG. 8A, an unreasonable difference provides a no-comparison signal, which may be used to indicate a detection problem, such as cycle skipping. However, if the comparison is reasonable, that indication is used to gate measurements $m_2$ and $m_3$ to adder 183 for combination to produce a compensated average measurement from the measurements.

Alternative circuitry illustrated in FIG. 8B is more appropriate for indicating the borehole compensation required to compensate either time or amplitude measurements. The memory delayed and the direct (current) measurements are gated to and compared at 182A. If the comparison is reasonable, the two measurements may be then combined as described above. However, if the comparison is unreasonable, this indication may be used to gate, via gates 181C and 181D, the measurements to difference amplifier 183A, whose output is summed at 184 and used to indicate the relative error in the two measurements.

The circuitry shown in FIGS. 8A and 8B may also be used for other compensating purposes. As previously described in regard to FIGS. 4C and 5B, the condition of tool tilt produces different degrees of eccentricity for various transducers and corresponding differences in the arrival times and amplitude measurements, which will be indicated by relative measurement indicator 184A. If the tilt results in an upper transducer pair that is more eccentered than the lower pair, it would be expected that the upper or memory delayed measurement would be shorter in time and less in amplitude relative to the direct measurement. Thus, the difference between the delayed and direct measurements will provide a negative indication. Conversely, if the lower transducer pair is more eccentered, the indication would be positive. This will be seen from the following example.

Consider measurements $m_2$ and $m_3$, defined as shown in Table II, taken when their known positions along the borehole correspond to the same formation interval. This takes place when the transducer array is moved, as for example, from position $d_I$ to $d_J$ in FIG. 2C. In effect, transducer $T_2$ replaces $T_1$ and $T_3$ replaces $T_4$. Formation paths B and C for $m_2$ at $d_I$ (here $m_2^*$) are substantially equal to path G for $m_3$ at $d_J$ (here $m_3$), and any errors between $m_2^*$ and $m_3$ will be due to differences in the comparable paths A and F in combination with E and H, as can be seen from FIGS. 4A or 4C. Thus, the difference $m_2^* - m_3$ equals $A + (B+C) + E - F - G - H = (A-F) + (E-H)$, assuming $B+C=G$.

As illustrated in FIGS. 4A or 4C, A is less than F and E is less than H, such that the differences $(A-F)$ and $(E-H)$ do not cancel, but are of like sign (both negative here) and combine to indicate both the nature of the error between these two measurements and its magnitude.

While the preceding discussion has generally been directed to acoustic measurements, additional methods and apparatus directed to other types of measurements, such as high frequency, electromagnetic measurements, etc. are possible and will be described. First, some inherent differences in the measurement techniques used in these additional applications will be reviewed.

FIG. 9A illustrates the type of detections used typically in acoustic travel time measurements or other measurements, where the signal period or wavelength is long compared to the resolution required. The signal is normally propagated as a pulse having positive and negative oscillations beginning with its arrival and relatively little signal prior to that time. Thus, as illustrated at I and II, corresponding to the reception signals that might be expected respectively at the near and far receivers, relatively little signal is present prior to its arrival. By design, the first and relatively weaker half-cycle will be provided a polarity opposite to that used for detection. A detection threshold amplitude different from zero to avoid noise and in the opposite polarity from the first half-cycle is employed. The detection corresponds to the point $T_x$ when the amplitude first swings beyond this threshold.

Thus, for I in FIG. 9A, the detection at the first receiver occurs as illustrated at $T_{x1}$ and the corresponding detection for II at $T_{x2}$. These detection points are related in time either to each other as for example, where $T_{x1}$ would begin a time interval, and $T_{x2}$ stop the time interval for the case of differential measurements, or in the case of individual sequential measurements, $T_x$ may be made relative to some earlier time such as $T_0$. In this manner, the measurement $m_1$ at III, corresponding to signal received at $T_2$, would begin at $T_0$ and stop at $T_{x1}$ while, for $T_3$ and $m_2$ at IV, the measurement would begin at the reference $T_0$ time and stop at $T_{x2}$. In this manner, the difference $m_2 - m_1$ provides the interval measurement $\Delta$ as illustrated at V.

Figure 9B:
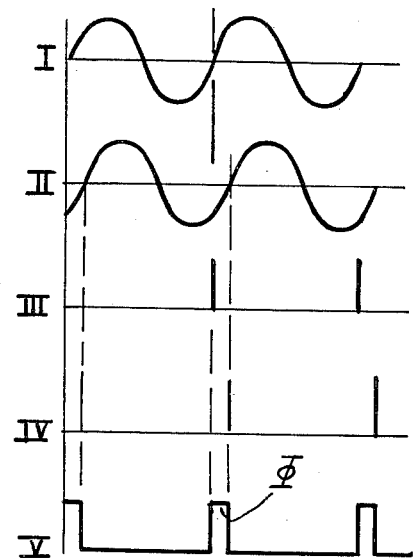

In electromagnetic measurements, the signals travel at significantly higher velocities and their periods are quite short compared to the required time resolution. Consequently, phase detection is usually employed rather than the zero crossing or threshold method illustrated in FIG. 9A. The phase relationship may be measured between signals received from the near and far receivers to obtain a differential measurement or if individual measurements are preferred, to a known reference signal of the same frequency. As illustrated at I and II of FIG. 9B, the two signals are displaced slightly as will be seen by comparing the zero crossing detection points at III for the signal on the line I with IV for the signal on the line II. Thus, as illustrated on line V, the phase shift $\Phi$ between the illustrated zero crossing points corresponds in much the same manner as the $\Delta t$ measurement illustrated in FIG. 9A. Particular circuitry to perform the above illustrated differential phase measurements will be found in the previously disclosed Calvert U.S. Pat. No. 3,849,721 patent and U.S. Pat. No. 3,944,910 issued on Mar. 16, 1976 to Rama Rau.

Figure 10:
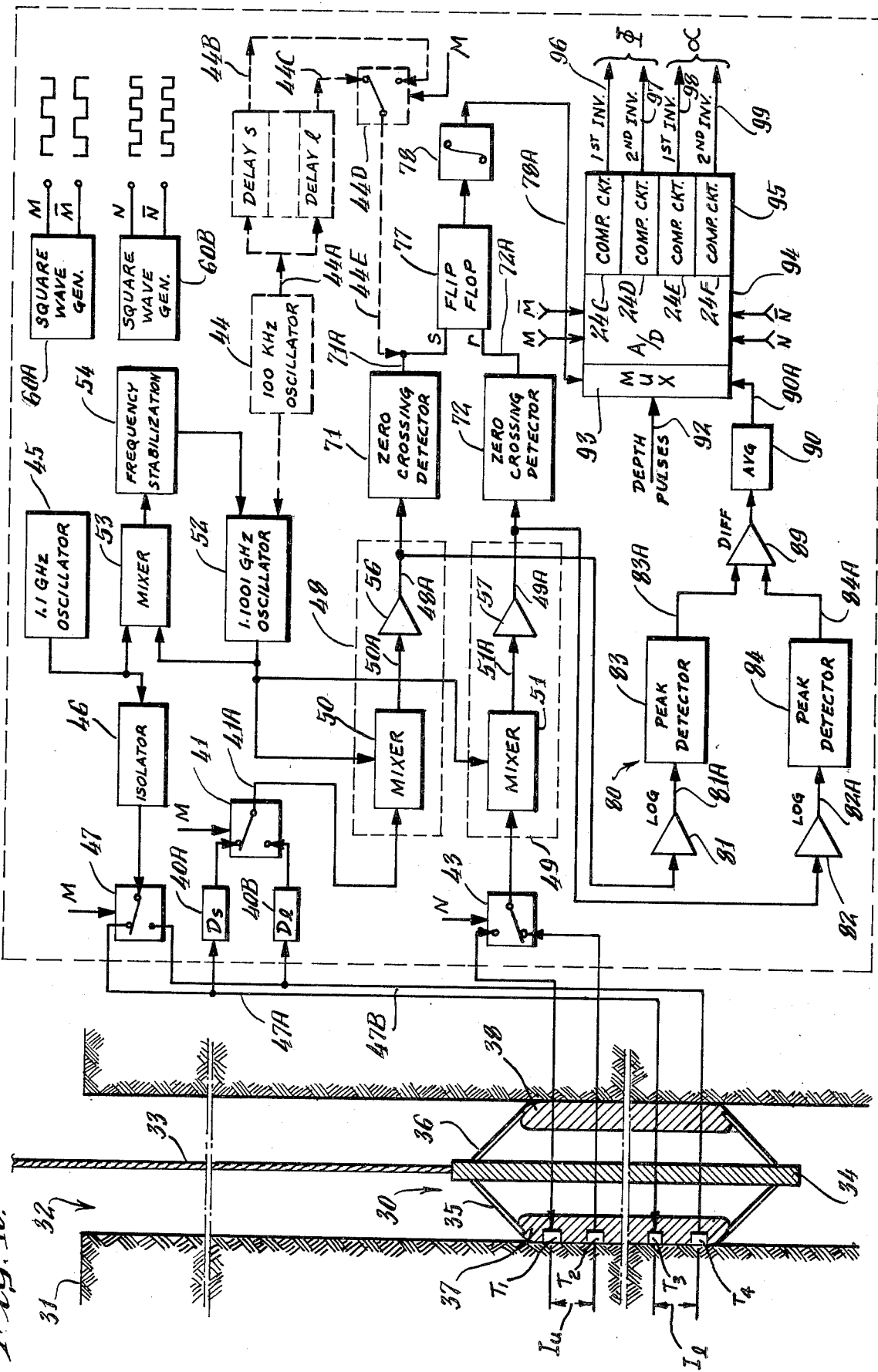

For an illustration of an application of the novel transducer array to an electromagnetic measurement, refer now to FIG. 10. The novel TT-RR compensation array takes the form of transmitter T and receiver R antennae supported on sidewall skid 37. As with the acoustic embodiment already described, two separations are identified between same-type transducer groups, here $I_u$ between receivers $T_1$ and $T_2$ and $I_l$ between transmitters $T_3$ and $T_4$. For electromagnetic measurements, $I_u$ and $I_l$ will be in the order of a few centimeters. Two T-R distances respectively 2 and 4 times I may be provided on reasonable length skids. The actual distances vary, as indicated by the division between $T_3$ and $T_2$, depending upon the frequency used in the measurement. This frequency-distance relationship is described further in the above patents. Where phase detection is employed, care must be taken that the distances provide the proper basis for phase comparison. For example, combinations of frequencies and distances which result in crossing through zero phase differences should be avoided.

Much of the circuitry illustrated in FIG. 10 is described in the above Calvert and Rau patents, and will not be detailed here. Provisions have been added to allow making individual T-R measurements rather than the usual R-R differential measurements. This is accomplished by providing a transmitter related signal for use as a reference signal in place of a missing receiver signal. The mode control signals M and N already described in conjunction with the acoustic embodiment are utilized as well in FIG. 10, here to steer the transmitter and receiver signals and the processing circuits. These control signals may be provided by conventionally designed square wave generators 60A and 60B.

As shown in FIG. 10, the transmitter signals are switched from the high frequency oscillator 45 by switch 47 as controlled by mode M to either leads 47A or 47B and transmitted respectively at $T_3$ or $T_4$. Simultaneously, signals are also delayed and attenuated to simulate formation conditions for short and long T-R distances by delays $D_s$ at 40A and $D_l$ at 40B and switched through switch 41 to serve as reference input 41A to mixer 50.

Transmitted signals propagate through the formation and are received at both $T_2$ and $T_1$, but only one of these signals is switched to mixer 51 depending upon switch 43 as controlled by N. The phase difference measurement is made using mixer circuits 48 and 49, zero crossing detectors 71 and 72 and sign reversing flip-flop 77 with integrator 78 to produce at 78A the phase or travel time measurement for the particular T-R combination. Further changes in modes M and N result in a sequence of such measurements, each made in the above manner by utilizing delays $D_s$ and $D_l$ to provide the preferred range of phase differences for the corresponding T-R distance. The four T-R combinations have already been described in conjunction with M and N in relation to Table II.

Rather than using the transmitter reference signal approach as a phase comparison basis, as illustrated by circuits 40, 41 and 48, alternate circuits 44 through 44E may be used. As shown by dashed lines in FIG. 10, a 100 kHz oscillator 44 may be used in conjunction with the high frequency oscillator 52 to provide synchronous 100 kHz clock pulses 44A which are then delayed by either delay $D_s$ to provide signal 44B or delay $D_l$ to provide signal 44C. These selectively delayed signals are then routed by switch 44D as determined by control pulse M such that output 44E may be used to replace the similar pulses normally output at 71A from zero crossing detector 71.

As disclosed in the Calvert and Rau patents, it is beneficial to also measure, along with the phase difference or travel time measurements, the amplitude or attenuation of the electromagnetic signals. Thus, a second set of measurements corresponding to peak amplitudes are desired. These are obtained simultaneously with the individual phase measurements by circuits 80 through 90 shown in FIG. 10 such that a continuous corresponding sequence of amplitude measurements for each T-R combination are provided at 90A.

Since the T-R combination measurements are acquired at different depths, a memory and gate circuit similar to that shown in FIG. 3A may be employed. Since the compensation provided by the use of the TT-RR array applies both to time or phase type measurements and to amplitude or attenuation type measurements, it is desired that these different type measurements, with each type having two different T-R distances, be provided the compensation.

Since the signals provided at 78A and 90A may appear as sequences of analog voltage levels, they may be converted from analog to digital measurement sequences by A/D converter 94 synchronized to multiplex the input sequence using multiplexer 93. The depth synchronization is provided for memory delay purposes by depth pulses 92, and the measurement sequence synchronization is controlled by control pulses M and N. The resulting digital output is then gated from the A/D converter to individual gate, memory and counter circuits 24C through 24F, each constructed as shown in FIG. 3A for circuits 24A and 24B. These compensation circuits respectively output first and second investigations representing different transmitter-to-receiver distances corresponding to output A and output B already described in regard to circuits 24A and 24B. However, in this case the investigations represent separate phase and attenuation measurements as shown at 96 through 99 of FIG. 10.

Referring now to FIG. 11, there is shown a further embodiment of the invention corresponding to the type of measurement where a given transducer may be operated either as a transmitter or a receiver, such as an antenna capable of transmitting or receiving electromagnetic waves. Thus, in FIG. 11, the transducer pairs are denoted as antenna $A_s$ and $A_l$ for one long- and short-distance antennae in one pair, respectively, and $A_s'$ and $A_l'$ for the other pair.

The ability to switch a given transducer of one type to another provides the advantage of differential measurements and a better duty cycle. Thus, a given transmission may be simultaneously received by both receivers and measured either as differential measurement, or individually relative to the same reference signal. Since in effect two measurements are made at the same time, each measurement may be averaged over a longer period.

Modifications illustrated in FIG. 11 to the circuits in already described FIG. 10 provide for switching the transmission signal generated by oscillator 45 to either 47A or 47B. Switch 41A, which is separately but synchronously controlled by steering pulse N, applies the short-distance transmitter signal to either $A_s$ or $A_s'$ and the long-distance transmitter signal to either $A_l$ or $A_l'$. Similarly, switch 42A selects two adjacent antennae for use as receiver pairs and routes the detected signals to the separate mixer circuits 48 and 49 previously described.

In this manner, differential receiver investigations may be obtained alternatively from the upper interval $I_u$ using $A_s$ and $A_l$ as near and far receivers while at the same time alternating between $A_s'$ and $A_l'$ as short- and long-distance transmitters. Then, without movement of the tool, differential receiver investigations may be obtained from the lower interval $I_l$ by using $A_s'$ and $A_l'$ as the pair of receivers while alternating between $A_s$ and $A_l$ as the transmitters. Thereafter, in accordance with this invention, the array is moved such that $A_l'$ and $A_s'$ are adjacent the interval $I_u$ previously investigated by $A_s$ and $A_l$. Processing circuitry 95 depth synchronizes the measurements and combines them to produce the compensated first and second investigation phase and attenuation measurements already described and illustrated in FIG. 10.

There has been illustrated method and apparatus for maximizing the use of a four-transducer array and measurements taken between different combinations of the transducers. By utilizing in a novel arrangement the same four transducers normally employed to provide borehole compensation measurements, these transducers can be used to provide measurements for determining not one, but two borehole compensated measurements, each investigating the same formation interval with a different transmitter-receiver distance. Since both investigations are compensated in the same manner, this compensation adds meaningfulness to any differences occurring between these different investigations and the interpretation significance attributed thereto, such as, for example, indicating the presence of gas in a subsurface formation.

In general, the novel transducer array allows double use of the measurements derived therefrom. The two-receiver measurements are used twice at each depth increment, once each in relation to the near and far transmitters. Then, in turn, the two-transmitter measurements are used twice, once each relative to the near and far receivers. Even the transmitter-receiver distance is in effect used twice by overlapping this distance, which allows desirable increases in the T-R distances without the undesirable increases in the array length associated with prior art arrays.

Further, since all transmitter-type transducers are located on the same side of the receiver-type transducers, signal propagation takes place in the same direction for all measurements, which readily facilitates the use of directional transducers. Further, since same-type transducers are grouped together, they operate in substantially similar borehole environments, which allows both the combination and the comparison of individual measurements made with different transducer combinations.

While the illustrative embodiments comprised acoustic and electromagnetic measurements, novel features of the invention apply as well to other types of measurements. Furthermore, although the receiver pair was generally illustrated as being the upper pair of transducers and the transmitter pair as the lower pair of transducers, it will be appreciated that features of the invention will be provided by the reversed arrangement. Similarly, the acquisition of measurements may be made as the transducer array is moved either upwardly, as illustrated, or downwardly in the borehole. Although the described embodiments provide for combining measurements as they are acquired at the well site, it will be appreciated that the individual measurements may be recorded and combined at a different time and place.

The above-described embodiments are, therefore, intended to be merely exemplary and all such variations and modifications are intended to be included within the scope of the invention as defined in the appended claims.

I claim:

1. Apparatus for producing measurements of a physical characteristic of subsurface media near a borehole penetrating the earth to provide for a borehole compensated measurement, comprising:

an elongated support member;

transducers of a first type supported by said member and separated along said member by a preselected separation along a line generally parallel to the elongation of said member;

transducers of a second type supported by said member and separated along said member by said preselected separation along said line, said second type transducers located along said line on one side of said first type transducers and said transducers of said first and second types having respective common operating characteristics; and means for producing measurements of said physical characteristic of subsurface media using combinations of said first and second type transducers at selected borehole positions for obtaining repetitive measurements of said physical characteristic for a selected interval of borehole depth.

2. The apparatus of claim 1 further including means for combining said measurements to provide a compensated measurement of the physical characteristic of subsurface media near said borehole.

3. The apparatus of claim 2, wherein:
said first type of transducers are receivers;
said second type of transducers are transmitters;
said producing means includes means for producing one set of measurements when said receivers have respective borehole positions and another set of measurements when said transmitters respectively have substantially said borehole positions; and
said combining means includes means for combining measurements from said one set and said another set of measurements to provide a borehole compensated measurement of the physical characteristic for an interval of the subsurface media corresponding to said borehole positions.

4. The apparatus of claim 3, wherein:
said one set of measurements includes measurements separately referenced to said transmitters, one of said transmitters being less distant and another of said transmitters being more distant along said line from one of said receivers, and said another set of measurements includes measurements separately referenced to said receivers, said one receiver being less distant and another of said receivers being more distant along said line from said one transmitter, and
said combining means includes:
means for combining measurements from said one set referenced to said less distant transmitter and from said another set referenced to said less distant receiver to provide one borehole compensated measurement; and
means for combining measurements from said one set referenced to said more distant transmitter and from said another set referenced to said more distant receiver to provide another borehole compensated measurement, whereby said one and another borehole compensated measurements correspond to two different transmitter-receiver distances.

5. The apparatus of claim 2, wherein said first-type transducers ($T_1$ and $T_2$) are a pair of receivers, one receiver ($T_2$) in said pair being less distant and another ($T_1$) more distant along said line from one of said second-type transducers; and said second-type transducers ($T_3$ and $T_4$) are a pair of transmitters, one transmitter ($T_3$) in said pair being less distant and another ($T_4$) more distant along said line from one of said first-type transducers;
said producing means produces a given measurement ($m_2$) using a first combination including said more-distant receiver ($T_1$) and said less-distant transmitter ($T_3$) when said first combination has a first borehole position at depth $d_I$, and a repeat measurement ($m_3$) using a second combination including said less-distant receiver ($T_2$) and said more-distant transmitter ($T_4$) when said second combination has approximately said first borehole position at depth $d_I$; and
said combining means combines said given and repeat measurements to provide an indication of a borehole compensation required to compensate measurements of said physical characteristic of the subsurface media near said borehole for said first borehole position.

6. The apparatus of claim 5 wherein said producing means produces measurements including one set of measurements ($m_1$ and $m_2$) when said receivers have a second borehole position at depth $d_I$ and another set of measurements ($m_3$ and $m_1$) when said transmitters have approximately said second borehole position at depth $d_1$;
said combining means combines said one and another sets of measurements to provide a borehole compensated measurement of the physical characteristics for an interval of the subsurface media near the borehole between $T_1$ and $T_2$ at depth $d_I$ and between $T_3$ and $T_4$ at depth $d_L$ for said selected borehole positions; and
wherein said indication of a borehole compensation indicates the borehole compensation provided in said borehole compensated measurement.

7. Apparatus for logging a characteristic of subsurface media surrounding a borehole and providing a borehole compensated measurement thereof, comprising:
an elongated support member;
a first pair of transducers, the transducers thereof being supported by said member and positioned at a preselected separation along said member;
a second pair of transducers, the transducers thereof being supported by said member and positioned at said preselected separation along said member and located on the same side of said first pair
means for operating a selected transducer of said first pair in conjunction with the transducers of said second pair when said second pair is at a borehole interval, to produce a first set of measurements; and for operating a selected transducer of said second pair in conjunction with the transducers of said first pair when said first pair substantially is at said borehole interval, to produce a second set of measurements; and
means for combining said first and second sets of measurements.

8. The apparatus of claim 7 wherein said combining means includes means for storing said first and second sets of measurements.

9. A transducer array for producing measurements of a physical characteristic of a subsurface media near a borehole penetrating the earth to provide for the derivation of a borehole compensated measurement, comprising:
an support member elongated for movement through the borehole;
a first pair of transducers supported by said support member at a preselected separation along a line generally parallel to the direction of the movement; and
a second pair of transducers supported by said support member at said preselected separation along said line and located on one side of said first transducer pair; said first and second pairs of transducers being so constructed and arranged for operating separately as pairs of transmitters and pairs of receivers having operating characteristics such that measurements made between different three transducer combinations of said transmitters and receivers may be repeated respectively when each transducer pair is moved to substantially the same borehole interval.

10. A method for producing sets of measurements of a characteristic of subsurface media surrounding a borehole penetrating the earth which are useful for subsequently providing a borehole compensated measurement, comprising the steps of:
- positioning the transducers of a first pair of transducers at respectively a first and a second position in the borehole, the distance therebetween being a preselected separation;
- positioning the transducers of a second pair of transducers at respectively said first and said second positions in the borehole, the transducers of said first and second pairs having operating characteristics enabling measurements to be repeated when alternate transducers in a given pair are at substantially the same borehole depth;
- maintaining said first pair and said second pair a preselected distance apart;
- operating a selected transducer of said first pair and the transducers of said second pair when a selected borehole interval is between said second pair to produce a first set of measurements; and
- operating a selected transducer of said second pair and the transducers of said first pair when said selected borehole interval is between said first pair to produce a second set of measurements.

11. The method of claim 10 further including the steps of:
- operating the other transducer of said first pair and the transducers of said second pair when said selected borehole interval is between said second pair to produce a third set of measurements; and
- operating the other transducer of said second pair and the transducers of said first pair when said selected borehole interval is between said first pair to produce a fourth set of measurements.

12. A method for logging a physical characteristic of subsurface media surrounding a borehole penetrating the earth and providing a borehole compensated measurement, comprising the steps of:
- coordinatively moving through the borehole a pair of transmitters and a pair of receivers while maintaining a preselected separation between said transmitters, said preselected separation between said receivers, and a preselected distance between said transmitter pair and said receiver pair;
- operating a selected one of said transmitters and said receiver pair, a borehole interval being defined between said receivers, to produce first measurements representative of the physical characteristic of the subsurface media adjacent said borehole interval;
- operating a selected one of said receivers and said transmitter pair when said borehole interval is substantially between said transmitter pair to produce second measurements representative of the physical characteristic of the subsurface media adjacent said borehole interval; and
- combining said first and second measurements to produce a borehle compensated measurement.

13. A method for producing measurements of a physical characteristic of subsurface media surrounding a borehole penetrating the earth to provide for a borehole compensated measurement, comprising the steps of:
- supporting a first pair of similar transducers longitudinally at a preselected separation on a support member elongated for movement through said borehole;
- supporting a second pair of similar transducers longitudinally at said preselected separation on said support member on one side of said first pair, generally colinear therewith, and longitudinally separated therefrom by at least said preselected separation;
- moving said support member through said borehole; and
- producing measurements of a physical characteristic of said subsurface media at different positions along said borehole in the direction of said movement using different three transducer combinations of the transducers of said first and second pairs.

14. The method of claim 13 wherein said step of producing measurements comprises the step of producing measurements when different transducers have effectively the same positions along said borehole.

15. The method of claim 14 and further including the step of recording said measurements and said positions along said borehole.

16. The method of claim 15 and further including the step of combining said measurements produced when different transducers have effectively the same positions along said borehole to provide a compensated measurement of said physical characteristic of subsurface media near said borehole.

17. The method of claim 15 wherein:
- the transducers of said first pair are receivers;
- the transducers of said second pair are transmitters; and
- said step of producing measurements includes the step of producing one set of measurements when said receivers have moved to a selected position along said borehole and another set of measurements when said transmitters have effectively moved to said selected position;
- and further including the step of combining said one and another sets of measurements to provide a borehole compensated measurement of the physical characteristic of the subsurface media near the borehole for said selected position.

18. The method of claim 17 wherein said one set of measurements includes measurements separately referenced to each transmitter respectively less and more distant from said receivers, and said another set of measurements includes measurements separately referenced to each receiver, respectively less and more distant from said transmitters, and wherein said step of combining measurements includes the steps of:
- combining measurements from said one set referenced to said transmitter less distant from said receivers and from said another set referenced to said receiver less distant from said transmitters to provide one borehole compensated measurement; and
- combining measurements from said one set referenced to said transmitter more distant from said receivers and from said another set referenced to said receiver more distant from said transmitters to provide another borehole compensated measurement.

19. Apparatus for producing measurements of a physical characteristic of subsurface media near a borehole penetrating the earth to provide for a borehole compensated measurement, comprising:
- a support member elongated in one dimension;
- transducers of a first type supported on said support member along a line generally parallel to the elongated dimension;
- transducers of a second type supported on said support member on one side of said first type transducers in a direction therefrom along said line; a first transducer of said first type being separated by a first distance and a second transducer of said first type being separated by a second distance along said line from a first transducer of said second type; and said first transducer of said second type being separated by said first distance and a second transducer of said second type being separated by said second distance along said line from said first transducer of said first type; the respective transducers of said first and second types having common operating characteristics; and means for producing measurements using different combinations of said transducers; said combinations including:
said first transducer of the first type and said first transducer of the second type to provide a first measurement;
said first transducer of the first type and said second transducer of the second type to provide a second measurement;
said second transducer of the first type and said first transducer of the second type to provide a third measurement; and
said second transducer of the first type and said second transducer of the second type to provide a fourth measurement.

20. The apparatus of claim 19 further comprising:
means for combining said first and third measurements made at a first apparatus depth to provide a first differential measurement between said first type transducers over a borehole interval;
means for combining said second and fourth measurements made at said first apparatus depth to provide a second differential measurement between said first type transducers over said borehole interval;
means for combining said first and second measurements made at a second apparatus depth to provide a third differential measurement between second type transducers over said borehole interval;
means for combining said third and fourth measurements made at said second apparatus depth to provide a fourth differential measurement between said second type transducers over said borehole interval;
means for combining said first differential measurement and said third differential measurement to provide one borehole compensated measurement; and
means for combining said second differential measurement and said fourth differential measurement to provide another borehole compensated measurement.

21. The apparatus of claim 19 further comprising means for combining said first and second measurements and said third and fourth measurements.

22. Apparatus for investigating a physical characteristic of subsurface media surrounding a borehole penetrating the earth, comprising:
a support member;
a pair of transmitters having substantially similar operating characteristics separated along said member by a preselected separation; and
a pair of receivers having substantially similar operating characteristics separated along said member by said preselected separation;
means for producing a first differential measurement over an interval of the borehole in response to operation of said transmitters in conjunction with one of said receivers; and
means for producing a second differential measurement over said interval in response to operation of said receivers in conjunction with one of said transmitters.

23. The Apparatus of claim 22 further comprising means for combining said first and second differential measurements to derive a composite measurement.

24. Apparatus for producing a borehole compensated measurement of a physical characteristic of subsurface media surrounding a borehole penetrating the earth, comprising:
an elongated support member adapted for movement through said borehole;
a pair of transducers of a first type separated along said member by a preselected separation;
a pair of transducers of a second type separated along said member by said preselected separation;
means for operating transducers of said first type at respective depths in conjunction with a transducer of said second type to obtain a first measurement of the physical characteristic of a subsurface media zone;
means for operating transducers of said second type substantially at respectively said respective depths in conjunction with a transducer of said first type to obtain a second measurement of the physical characteristic of substantially said subsurface media zone; and
means for combining said first and second measurements to derive a compensated measurement of said characteristic.

25. Apparatus for producing a borehole compensated measurement of a physical characteristic of subsurface media surrounding a borehole penetrating the earth, comprising:
an elongated support member adapted for movement through said borehole;
a first pair of transducers positioned along said member at a preselected separation;
a second pair of transducers positioned along said member at said preselected separation, said second pair being separated from said first pair;
means for operating the transducers of said first pair in conjunction with a selected transducer of said second pair to obtain a first measurement of the physical characteristic over a borehole interval;
means for operating the transducers of said second pair in conjunction with a selected transducer of said first pair to obtain a second measurement of the physical characteristic over substantially said interval; and
means for combining said first and second measurements.

26. A method of producing a borehole compensated measurement of a characteristic of subsurface media surrounding a borehole penetrating the earth, comprising the steps of:
moving a transducer array through said borehole, said array comprising a plurality of transducers of respectively a first and a second type;
deriving a first measurement of the characteristic of a zone of subsurface media when a pair of transducers of the first type having a given separation distance are positioned at given depths in the borehole and are operated in conjunction with one of the transducers of said second type;

deriving a second measurement of the characteristic of said zone when a pair of transducers of the second type having said given separation distance are positioned at said respective depths and are operated in conjunction with one of the transducers of said first type; and combining said first and second measurement to provide a composite measurement of said characteristic of said zone.

27. A method of producing a borehole compensated measurement of a characteristic of subsurface media surrounding a borehole penetrating the earth, comprising the steps of:

selecting a first measurement of the characteristic of a zone of subsurface media obtained from the operation of a pair of transducers of a first type in a borehole interval in conjunction with a transducer selected from a pair of transducers of a second type, said first type transducers and said second type transducers being supported on a member adapted for movement through the borehole and the respective transducers thereof being separated from one another by a preselected separation and having substantially similar operating characteristics;

selecting a second measurement of the characteristic of said zone obtained from the operation of said second type transducers substantially in said borehole interval in conjunction with a selected one of said first type transducers; and combining said first and second measurement to obtain a compensated measurement of the characteristic of said zone.

28. The apparatus of claim 3, wherein said one set of measurements includes measurements separately referenced to a selected one of said transmitters, one of said transmitters being less distant and another of said transmitters being more distant along said line from one of said receivers, and said another set of measurements includes measurements separately referenced to a corresponding-spaced one of said receivers, said one receiver being less distant and another of said receivers being more distant along said line from said one transmitter, and said combining means includes means for combining measurements from said one set referenced to said selected transmitter and from said another set referenced to said corresponding-spaced receiver to provide a borehole compensated measurement.

29. The apparatus as in claim 7 further comprising means for performing initial and repeat measurements for a borehole level with, respectively, respective transducers of said first and second pairs and respective alternate transducers of said first and second pairs.

30. The apparatus of claim 7 wherein the operating characteristics of the transducers of respectively said first pair and said second pair enable a measurement to be repeated when alternate transducers of one of said first and second pairs are at substantially the same borehole depth.

31. The apparatus of claim 30 wherein the distance along said member between adjacent transducers of respectively said first pair and said second pair is at least said preselected separation.

32. The method of claim 12 further including the steps of:

operating the other one of said transmitters and said receiver pair when said borehole interval is substantially between said receiver pair to produce third measurements representative of the physical characteristic of the subsurface media adjacent said borehole interval;

operating the other one of said receivers and said transmitter pair when said borehole interval is substantially between said receiver pair to produce fourth measurements representative of the physical characteristic of the subsurface media adjacent said borehole interval; and combining said third and fourth measurements to produce another borehole compensated measurement.

33. The method of claim 10 further comprising the step of maintaining at least said preselected separation between said first pair and said second pair.

34. The method of claim 12 further comprising the step of maintaining at least said preselected separation between said transmitter pair and said receiver pair.

35. The apparatus of claim 3, 4 or 28 wherein said one set of measurements is produced at a first apparatus depth and said another set of measurements is produced at a second apparatus depth, further including means for storing and reproducing measurements produced at said first apparatus depth for delaying said one set of measurements for a depth interval generally corresponding to the difference between said first and second apparatus depths.

36. The apparatus of claim 35 wherein said combining means includes means for combining said one set of measurements produced at said first apparatus depth and said another set of measurements produced at said second apparatus depth to provide a borehole compensated measurement.

37. The apparatus of claim 36 wherein said transducers are acoustic transducers for obtaining travel times for acoustic energy through the borehole and subsurface media.

* * * * *

UNITED STATES PATENT AND TRADEMARK OFFICE
CERTIFICATE OF CORRECTION

PATENT NO. : 4,346,460
DATED : August 24, 1982
INVENTOR(S) : Nick A. Schuster

It is certified that error appears in the above-identified patent and that said Letters Patent is hereby corrected as shown below:

In the Specification, Column 4, lines 4-5, "Pat. No." should be deleted. Column 16, line 53, "9174" should read --1974--. Table III, the row indexed by CONTR. PULSE C2 should include the term -- $+m_2^*$ $-m_1$ $-m_1^*$ -- in the column indexed by C#2, and the term " $+m_2^*$ " in the space above this row-column intersection and the term " $-m_1$ $-m_1^*$ " in the space below this row-column intersection should be deleted. Column 21, line 38, "borehold" should read --borehole--; line 42, "$m'_s$" should read -- $m_s'$ --; line 43, " $m'_\ell$ " should read -- $m_\ell'$ --. Column 27, line 16, "$\Delta$" should read -- $\Delta t$ --.

UNITED STATES PATENT AND TRADEMARK OFFICE
CERTIFICATE OF CORRECTION

PATENT NO. : 4,346,460

DATED : August 24, 1982

INVENTOR(S) : Nick A. Schuster

It is certified that error appears in the above-identified patent and that said Letters Patent is hereby corrected as shown below:

Column 29, line 19, "$A_s'$ and $A_\ell'$" should read -- $A'_s$ and $A'_\ell$ --; line 34, "$A_s'$" should read -- $A'_s$ --; line 35, "$A_\ell'$" should read -- $A'_\ell$ --; line 43, "$A_s'$" should read -- $A'_s$ --; line 46, "$A_s'$ and $A_\ell'$" should read -- $A'_s$ and $A'_\ell$ --; line 49, "$A_\ell'$ and $A_s'$" should read -- $A'_\ell$ and $A'_s$ --.

Signed and Sealed this

Sixth Day of March 1984

[SEAL]

Attest:

Attesting Officer

GERALD J. MOSSINGHOFF

Commissioner of Patents and Trademarks